(12) United States Patent
Zameroski

(10) Patent No.: US 11,867,123 B2
(45) Date of Patent: Jan. 9, 2024

(54) FLEXURE ISOLATOR AND METHOD OF COMPLIANT ISOLATION

(71) Applicant: LORD Corporation, Cary, NC (US)

(72) Inventor: Daniel Zameroski, McKean, PA (US)

(73) Assignee: Lord Corporation, Cary, NC (US)

( * ) Notice: Subject to any disclaimer, the term of this patent is extended or adjusted under 35 U.S.C. 154(b) by 1019 days.

(21) Appl. No.: 16/605,537

(22) PCT Filed: Apr. 20, 2018

(86) PCT No.: PCT/US2018/028555
§ 371 (c)(1),
(2) Date: Oct. 16, 2019

(87) PCT Pub. No.: WO2018/195414
PCT Pub. Date: Oct. 25, 2018

(65) Prior Publication Data
US 2020/0123978 A1 Apr. 23, 2020

Related U.S. Application Data

(60) Provisional application No. 62/487,659, filed on Apr. 20, 2017.

(51) Int. Cl.
*F16F 1/40* (2006.01)
*F16F 1/42* (2006.01)
*F16F 3/02* (2006.01)
*B23Q 11/00* (2006.01)
(Continued)

(52) U.S. Cl.
CPC ............ *F02C 7/20* (2013.01); *B23Q 11/0032* (2013.01); *F16F 1/40* (2013.01); *F16F 1/426* (2013.01);
(Continued)

(58) Field of Classification Search
CPC ...... F16F 1/32; F16F 1/328; F16F 1/40; F16F 1/426; F16F 1/50; F16F 3/023;
(Continued)

(56) References Cited

U.S. PATENT DOCUMENTS 1,679,890 A * 8/1928 Baldwin .................. H02K 7/16
494/84
2,918,271 A * 12/1959 Crites ...................... A47C 7/32
29/896.92

(Continued)

FOREIGN PATENT DOCUMENTS

DE 755629 C 8/1951
EP 0 303 405 8/1951
(Continued)

OTHER PUBLICATIONS

Translation FR 2601739 A. (Year: 1988).*

*Primary Examiner* — Thomas J Williams
(74) *Attorney, Agent, or Firm* — McAfee & Taft

(57) ABSTRACT

An engine mount device includes a housing, a carrier within a cavity in the housing, and a flexure flexibly connecting the carrier to the housing, with a pin disposed in a hole in the carrier to support an engine. A method of providing isolation in the engine mount device includes transmitting a force from the pin into the carrier; mechanically isolating the carrier from the housing via the flexure; and providing, via the flexure, a higher stiffness in one or more radial directions of the hole compared to a stiffness provided in an axial direction of the hole.

52 Claims, 26 Drawing Sheets

(51) Int. Cl.
*F02C 7/20* (2006.01)
*F16F 13/00* (2006.01)
*B64D 27/26* (2006.01)

(52) U.S. Cl.
CPC .............. *F16F 3/023* (2013.01); *F16F 13/00* (2013.01); *B64D 27/26* (2013.01); *B64D 2027/262* (2013.01); *F05D 2260/96* (2013.01)

(58) Field of Classification Search
CPC ..... F16F 13/00; B23Q 11/0032; B64D 27/26; B64D 2027/262; F05D 2260/96
USPC .................................................. 267/133, 160
See application file for complete search history.

(56) References Cited

U.S. PATENT DOCUMENTS

| | | | | |
|---|---|---|---|---|
| 4,499,772 A | * | 2/1985 | Haas | .......................... F16F 1/32 73/666 |
| 4,634,081 A | * | 1/1987 | Chee | ...................... B64D 27/26 60/797 |
| 9,080,633 B2 | | 7/2015 | Ab Malek et al. | |
| 9,180,975 B2 | | 11/2015 | Brochard et al. | |
| 9,238,510 B2 | | 1/2016 | Brochard et al. | |
| 2004/0094882 A1 | * | 5/2004 | Coppoolse | .............. F16C 11/12 267/160 |
| 2012/0018577 A1 | | 1/2012 | Quiroz-Hernandez | |
| 2016/0146282 A1 | | 5/2016 | Collard et al. | |
| 2020/0123978 A1 | * | 4/2020 | Zameroski | ......... B23Q 11/0032 |

FOREIGN PATENT DOCUMENTS

| | | | | |
|---|---|---|---|---|
| EP | 535628 A1 | | 9/1992 | |
| FR | 2601739 A1 | * | 1/1988 | ................ F16F 7/14 |
| FR | 2616866 A1 | * | 12/1988 | ................ F16F 7/14 |
| GB | 816873 A | * | 7/1959 | ............. B64D 27/26 |
| JP | 2014521006 A | * | 8/2014 | ................ F16F 1/32 |
| WO | 2014/111534 | | 7/2014 | |
| WO | WO2014111534 | | 7/2014 | |

\* cited by examiner

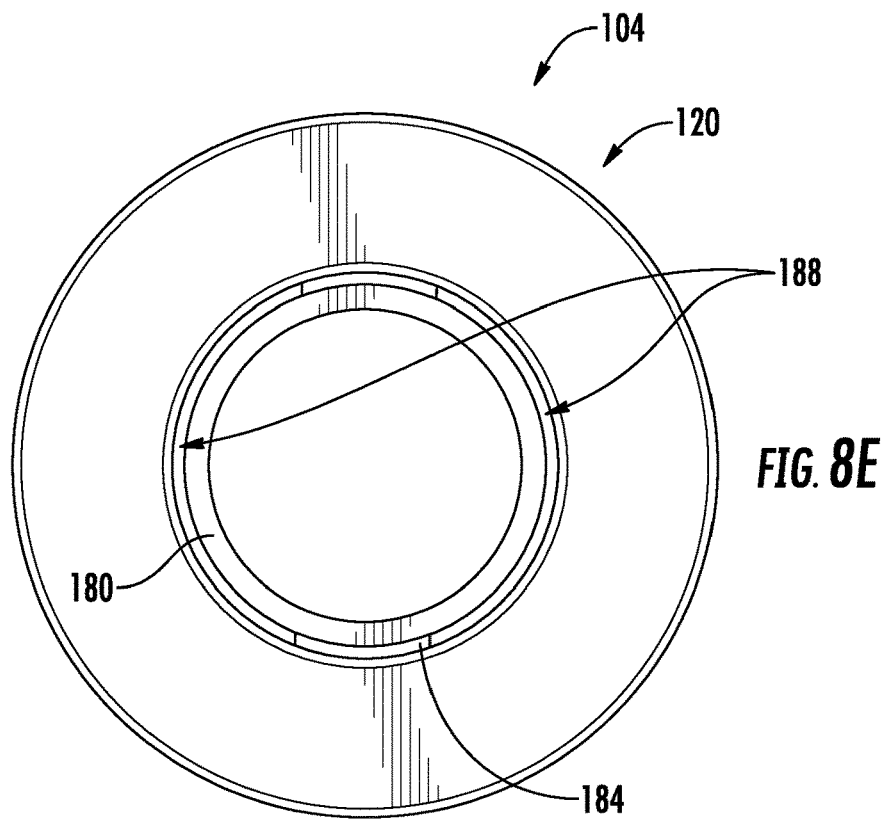
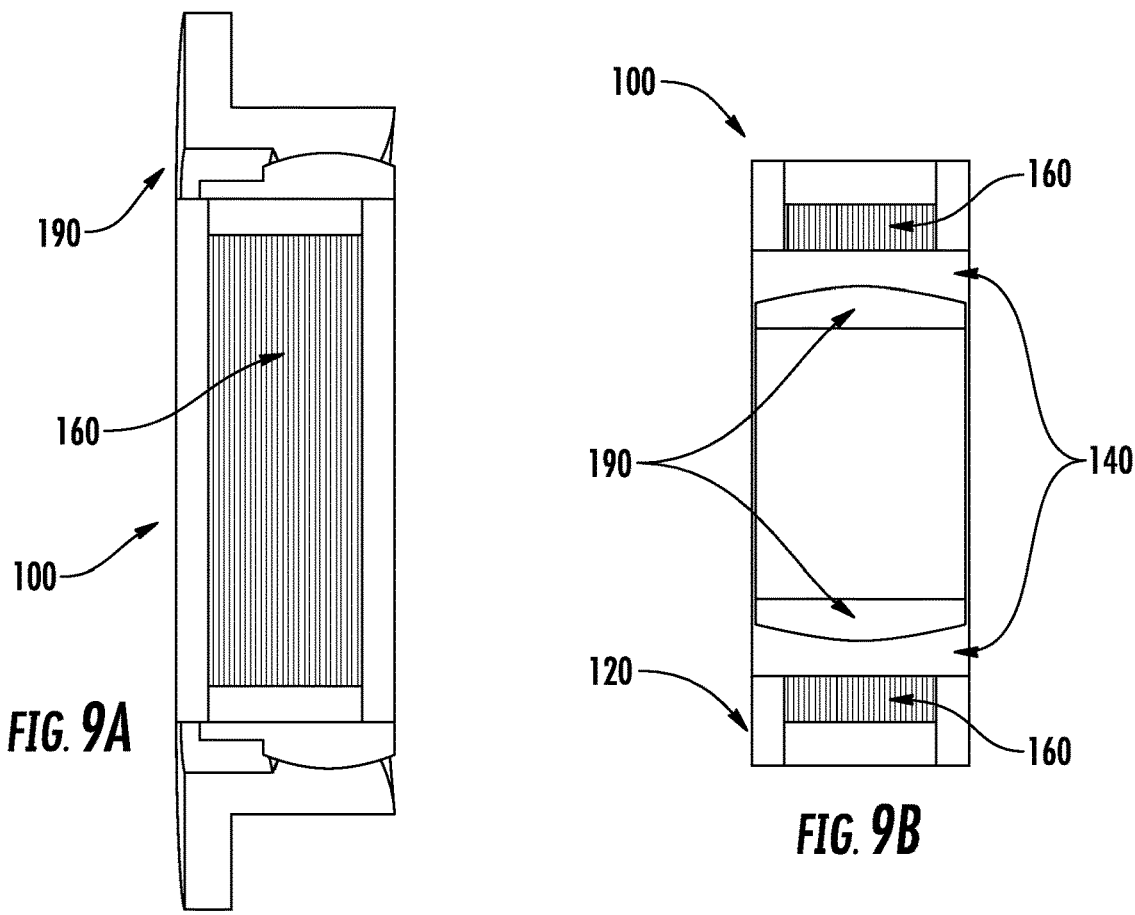

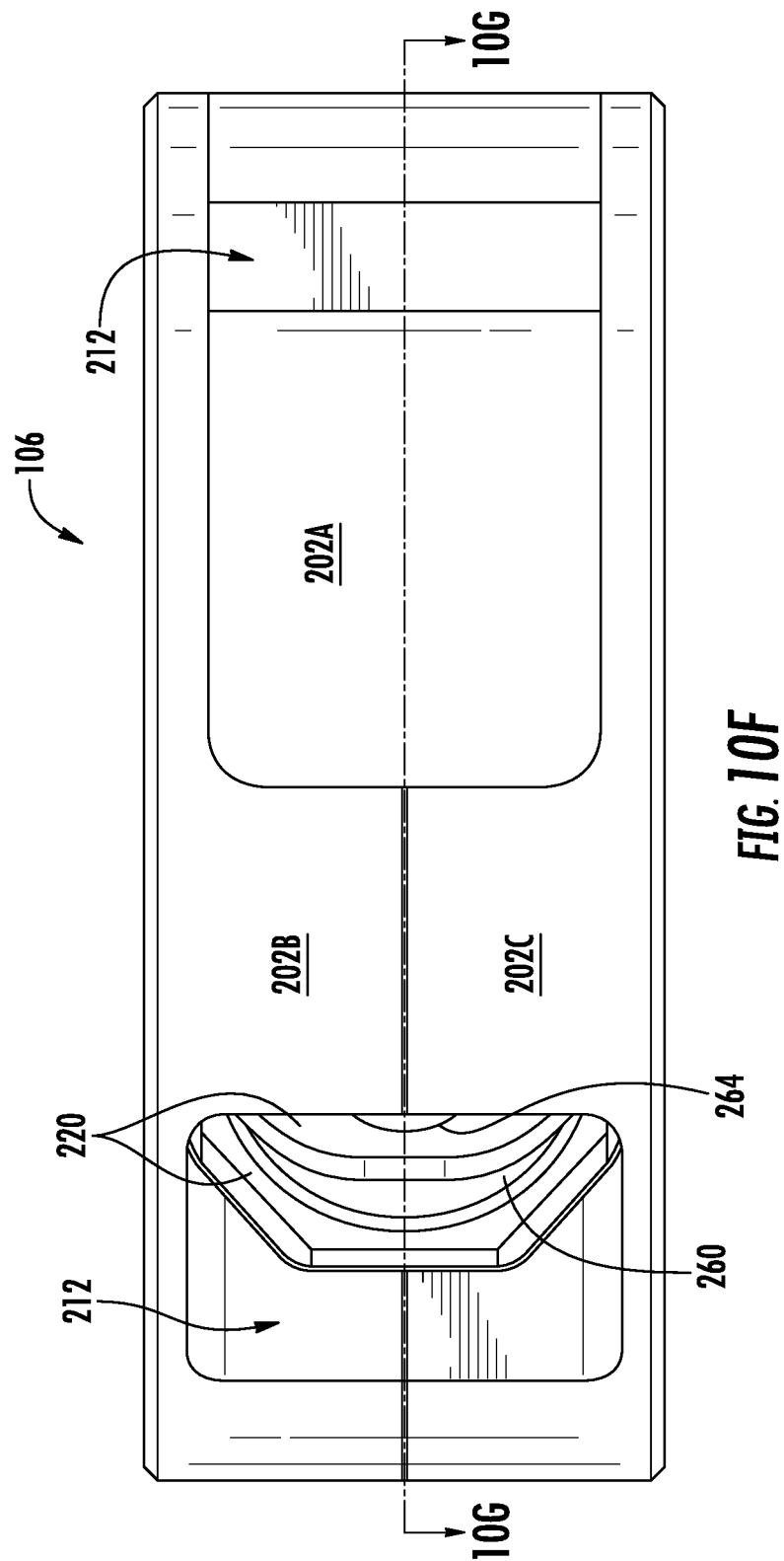

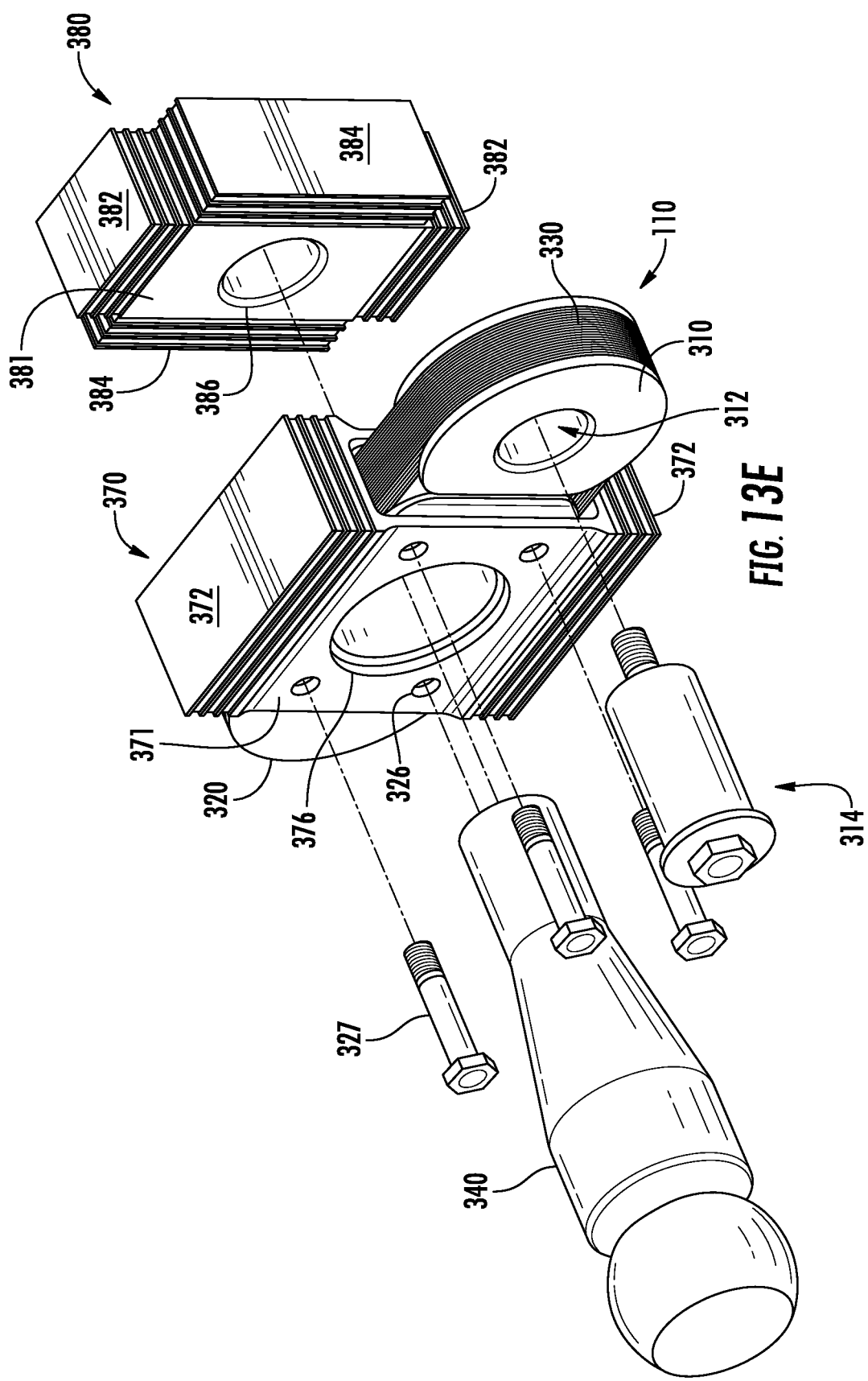

FLEXURE ISOLATOR AND METHOD OF COMPLIANT ISOLATION

CROSS-REFERENCE TO RELATED APPLICATIONS

This application claims the benefit of U.S. Provisional Patent Application Ser. No. 62/487,659, which was filed on Apr. 20, 2017, the disclosure of which is incorporated herein by reference in its entirety.

TECHNICAL FIELD

The subject matter disclosed herein relates to an engine mount. In particular, the presently disclosed subject matter relates to a compliant engine mount, as well as associated methods of use to reduce the transmission of forces, vibrations, and static motion between a supported structure (e.g., an engine) and a base structure or vehicle.

BACKGROUND

Modern vehicles continue to offer improved refinement and isolation for passengers from noises and vibrations generated by components of the vehicle during travel. This improved refinement and vibrational isolation is especially important in aircraft applications, in particular for applications in small turbofan aircraft.

Compliant mount systems are often used to reduce vibration and force transmission from engines or similar subsystems to a base structure or a vehicle. Such conventionally known compliant mounting devices are capable of reducing vibration and force transmission to the vehicle, but result in increased motion compared to a stiffer conventional "hard" engine mount system. This increased motion induced by such conventional compliant mounting systems must be adequately controlled, requiring a design that compromises in various aspects to achieve adequate reductions in vibration and force transmission, while ensuring that any increase in static displacement of the supported structure (e.g., an engine) from the compliant aspects of the compliant mount device is sufficiently controlled.

Conventional compliant mounts often incorporate elastomers because of their ability to compensate and control larger ranges of motion with softer spring rates. However, elastomers have a significant disadvantage in the form of the tendency of such elastomeric materials to take on a compression "set" (e.g., the amount by which an elastomeric material fails to return to its original form after release from reacting a prolonged static compressive load) and/or to exhibit characteristics of "creep" (e.g., the time-dependent part of a strain resulting from stress) over time when such elastomeric materials are loaded, thereby requiring additional design considerations and compromises to be made in any such design for motion of such supported structures.

To minimize excessive and potentially damaging deflections and/or deformations, stops (e.g., snubbing elements) can be used within such compliant mounting systems. However, when stops are incorporated in conjunction with elastomers, the stops must be designed and located to accommodate the "set" and/or "creep" of the elastomeric materials throughout the operational life of such a compliant elastomeric mount. This required additional motion control capability is necessary to ensure the mount continues to provide the desired compliant behavior characteristics over its expected life, without any such snubbing elements being engaged at lower levels of deflection than for which the elastomeric material is designed without accounting for "set" and/or "creep".

Accordingly, it would be advantageous for improved compliant engine mount device and methods which are able to reduce vibration and force transmission from an engine or such similar structure to a base structure or a vehicle without all of the drawbacks associated with presently known compliant engine mount devices.

SUMMARY

In one aspect, an engine mount device is provided. The engine mount device includes a housing; a carrier that is at least partially inside the housing, the carrier comprising a hole through at least a partial thickness of the carrier, the hole being configured to receive a trunnion pin; and at least one flexure connecting the carrier to the housing. The at least one flexure is configured to provide higher stiffness in one or more radial directions of the hole compared to a stiffness provided in an axial direction of the hole.

In another aspect, an engine mount device is provided. The engine mount device includes a housing; a carrier that is at least partially inside the housing, the carrier comprising a hole through at least a partial thickness of the carrier, the hole being configured to receive a trunnion pin; and at least one flexure connecting the carrier to the housing. The at least one flexure is configured to provide higher stiffness in one or more radial directions of the hole compared to a stiffness provided in an axial direction of the hole. The engine mount device comprises at least two rotary spindles within notches in the carrier. In some such embodiments, the housing comprises at least a first housing portion and a second housing portion, the carrier is connected to the first housing portion by the at least one flexure, each rotary spindle is secured to the carrier by a pin, the first housing portion comprises channels therein, the at least one flexure comprises a single continuous wire secured around the at least two rotary spindles, portions of the at least one flexure between the at least two rotary spindles are held within the channels of the first housing portion, the at least two rotary spindles define an axis of rotation for the carrier relative to the housing, and the carrier is configured to rotate about the axis of rotation.

In another aspect, an engine mount device is provided. The engine mount device includes a housing; a carrier that is at least partially inside the housing, the carrier comprising a hole through at least a partial thickness of the carrier, the hole being configured to receive a trunnion pin; and at least one flexure connecting the carrier to the housing. The at least one flexure is configured to provide higher stiffness in one or more radial directions of the hole compared to a stiffness provided in an axial direction of the hole. In some such embodiments, the housing comprises at least a first housing portion and a second housing portion, the at least one flexure comprises a plurality of flexures, and the carrier is connected to the first housing portion by the plurality of flexures.

In another aspect, in an engine mount device comprising a housing, a carrier within the housing, and at least one flexure flexibly connecting the carrier to the housing, with a trunnion pin being disposed in a hole in the carrier to support an engine, a method of providing isolation in the engine mount device, the method including transmitting a force from the trunnion pin into the carrier; mechanically isolating the carrier from the housing via the at least one flexure; and providing, via the at least one flexure, a higher stiffness in one or more radial direction of the hole compared to a stiffness provided in an axial direction of the hole.

In another aspect, an engine mount device is provided. The engine mount device includes a first housing with a hole through a thickness of the first housing; a second housing adjacent to the first housing, wherein the second housing has a hole through a thickness of the second housing; and a flexure surrounding an outer perimeter of the first and second housings. The flexure is configured to provide a higher stiffness in one or more radial directions of the hole of the first housing compared to a stiffness provided in an axial direction of the hole of the first housing.

In another aspect, a vibration isolation system is provided. The vibration isolation system includes: a yoke having an inner pocket through at least a part of a thickness of the yoke, a channel through a fore or aft surface of the yoke that the channel is connected to the inner pocket, a pocket through a surface of the yoke opposite the channel such that the pocket is connected to the inner pocket, and a hole through a thickness of the pocket; a first isolator within the inner pocket, the first isolator comprising a pocket; a second isolator internal to the first isolator within the inner pocket; an engine mount device having a first housing with a hole through a thickness of the first housing, a second housing adjacent to the first housing, the second housing having a hole through a thickness of the second housing; and a flexure surrounding an outer perimeter of the first and second housings, the flexure being configured to provide a higher stiffness in one or more radial directions of the hole of the first housing compared to a stiffness provided in an axial direction of the hole of the first housing, the first housing being within the pocket of the yoke and the second housing being at least partially within the pocket of the first isolator, and the first housing being fastened to the yoke by a fastener; and a trunnion pin configured to transfer force and/or vibration to the engine mount device.

BRIEF DESCRIPTION OF THE DRAWINGS

FIG. 8E is a front view of the compliant engine mount of FIG. 8A.

FIG. 9A is a schematic side view of a compliant engine mount illustrated in FIG. 1 pivotably mounted in a rigid monoball structure.

FIG. 9B is a schematic cross-sectional view of a compliant engine mount illustrated in FIG. 1, but with a rigid monoball structure mounted internally within the carrier.

FIG. 10F is a top view of the compliant engine mount of FIG. 10A.

FIGS. 13D and 13E are exploded assembly views of the engine mount system shown in FIGS. 13A, 13B, and 13C.

DETAILED DESCRIPTION

Figure 1:
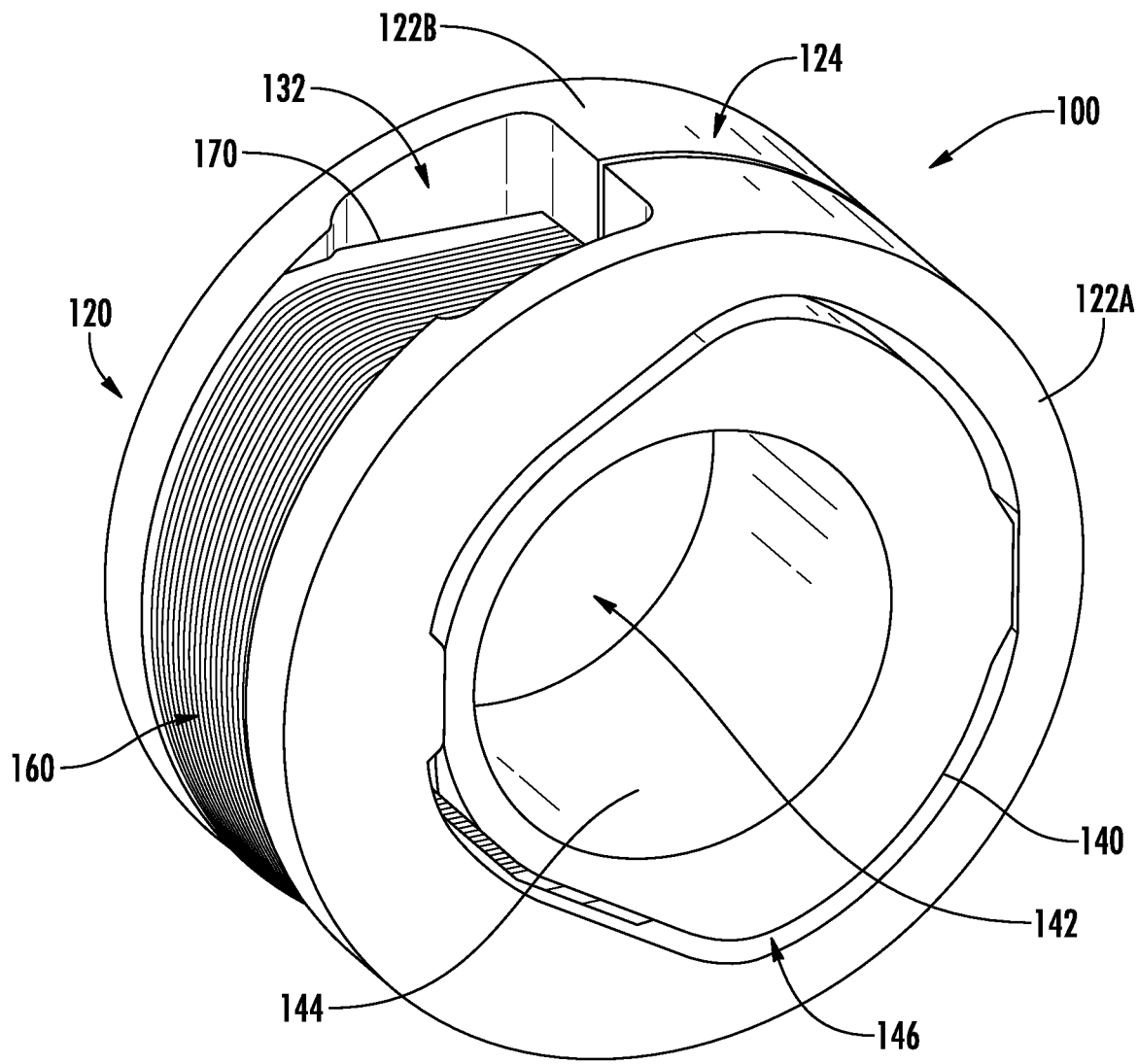
FIG. 1 shows an example embodiment of a compliant engine mount with a flexure configured to provide a higher stiffness in a radial direction than a stiffness in an axial direction.

This disclosure relates to compliant mounting devices and vibration isolation systems, which are configured to reduce vibration and force transmission between a supported device, such as an aircraft engine, and a support structure, such as an aircraft fuselage, as well as methods for providing vibration and force isolation. In some embodiments, the trunnion pin is rigidly attached to the supported device, such as an aircraft engine, and is inserted inside the engine mount device, which is rigidly attached to the supporting structure, such as the aircraft fuselage. In other embodiments, the trunnion pin is rigidly attached to the supporting structure, such as the aircraft fuselage, and is inserted inside the engine mount device, which is rigidly attached to the supported device, such as an aircraft engine. The engine mount devices are configured to provide a higher stiffness in one or more radial directions, such as vertical and thrust directions of an aircraft on the ground and/or during a cruise phase of flight, than a stiffness provided in an axial direction, such as a direction aligned with a trunnion pin inserted into an engine mount device to support, for example, an aircraft engine. In some embodiments, the stiffness in the one or more radial directions, including the thrust and/or vertical directions as defined hereinabove, can be at least an order of magnitude, i.e., greater by a factor of at least ten, than a stiffness provided in the axial direction, which is aligned with the longitudinal axis of the trunnion pin. In some embodiments, the stiffness in the one or more radial directions, including the thrust and/or vertical directions as defined hereinabove, can be at least two orders of magnitude greater, i.e., greater by a factor of at least 100, than the stiffness provided in the axial direction, which is aligned with the longitudinal axis of the trunnion pin. In some embodiments, the stiffness in the one or more radial directions, including the thrust and/or vertical directions as defined hereinabove, can be at least three orders of magnitude greater, i.e., greater by a factor of at least 1,000, than the stiffness provided in the axial direction, which is aligned with the longitudinal axis of the trunnion pin.

In some other embodiments, the stiffness in the one or more radial direction can be at least double the stiffness provided in the axial direction. In some other embodiments, the stiffness in the one or more radial direction can be at least triple the stiffness provided in the axial direction. In one example embodiment, the engine mount can provide a stiffness in the axial direction of about 1,400 pounds/inch (lb/in) or about 245 Newton/millimeter (N/mm) of deflection and a stiffness in the thrust-aligned radial direction of up to about 5,000,000 lb/in or 875,634 N/mm. Examples of applications for such compliant mounting devices include engine mount systems having a "center trunnion" design, similar to those used in aircraft engine mount applications. In such engine mount systems, the center trunnion is typically configured to slidingly receive a trunnion pin mounted to the engine; an opposite arrangement is also reasonably common, with the mount being on the engine and receiving a trunnion pin fixed to the frame of the aircraft. A typical center trunnion engine mount is configured to provide high degrees of stiffness in the radial directions of the trunnion pin so as to react the thrust forces transmitted from the engine via the trunnion pin. Such engine mounts may be constructed as a monoball or spherical bearing. One important consideration for such center trunnion style mounts is that the engine is configured to move axially over the trunnion pin with low stiffness. However, in many aircraft applications, during normal operation, the radial thrust forces reacted by the center trunnion are of sufficient magnitude that the longitudinal/axial frictional forces between the center trunnion and the trunnion pin significantly increase and effectively prevent axial movement of the trunnion pin within the center trunnion, especially when subjected to higher-frequency low amplitude dynamic forces associated with noise and vibration transmitted into the airframe, or fuselage, of an aircraft. As such, a compliant "center trunnion" style engine mount is disclosed herein that is configured to react thrust forces in the radial direction, while allowing for axial movement of the engine pin that is largely unaffected by frictional forces induced by the thrust forces.

FIG. 1 is an illustration of an example embodiment of a compliant engine mount, generally designated 100, in the form of a center trunnion mount configured to support and attach, for example, an aircraft engine to an aircraft frame. As can be seen in FIG. 1, mount 100 according to this example embodiment has a housing, generally designated 120, a carrier 140, and a flexure, generally designated 160. Housing 120 has an outer profile that is substantially circular, thus enabling mount 100 to be installed within a conventional cylindrical socket of either a frame (e.g., an airframe) or an engine. The carrier 140 fits within a cavity (see, e.g., cavity 126 in FIG. 2) within housing 120. The orientation of carrier 140 relative to housing 120 is defined by one or more keyed features, generally designated 146, formed in housing 120 and carrier 140 to prevent improper assembly. In this embodiment, flexure 160 is at least partially coated with an elastomeric material 170 configured to reduce the transmission of vibration. Elastomeric material 170 is configured to provide an environmental seal around the internal components of flexure 160, as well as to damp high frequency "ringing" modes of the individual flexing layers (see, e.g., 162 in FIG. 3) of flexure 160. Vibration isolation and/or damping is provided primarily through the comparatively low stiffness aspect of flexure 160 in the axial, or lateral, direction (e.g., z-direction) relative to the higher stiffness aspects provided by mount 100 in the vertical direction (e.g., the y-direction) and/or the thrust direction (e.g., x-direction). This comparatively lower stiffness in the axial direction allows lateral movement of carrier 140 and the supported device (e.g., the engine) relative to housing 120 with low force transmittal to the support structure (e.g., the frame), thereby reducing the amount of vibratory force and displacement imparted to the airframe. This arrangement is very effective in reducing the vibration transmission of the primary tonal excitation frequencies of the engine (e.g., N1 and N2, including within the range of 80-500 Hz.), but also in reducing broadband disturbances. In some embodiments, elastomeric material 170 is molded by injecting elastomeric material 170 in liquid form in and around flexure 160 after the assembly thereof. In other embodiments, elastomeric material 170 can be formed as layers that are incorporated between each layer of flexure 160 to provide internal damping aspects to flexure 160. This provides a wear-resistant shear-connection between each of the flexing layers for relative motion due to bending. In still other embodiments, elastomeric material 170 can be manually layered during the assembly process. In yet another embodiment, flexure 160 is encapsulated by a pourable potting compound, adhesive, or epoxy, after assembly of the device. Elastomeric material 170 also provides an environmental barrier for flexure 160, preventing particulate and liquid infiltration, which can lead to corrosion and premature degradation of performance of flexure 160, thereby reducing the useful service life of mount 100. In some embodiments, the individual flexing layers of flexure 160 may be coated in elastomeric material 170 during assembly of mount 100. In some embodiments, elastomeric material 170 is formed and/or molded such that an outer surface of elastomeric material 170 is substantially the same height as the outer circumferential surfaces of housing portions 122A and 122B, such that mount 100 has a substantially smooth and/or continuous outer annular surface. Elastomeric material may be incorporated in any of the embodiments disclosed herein without limitation, at least in any manner described hereinabove.

When in a laterally un-deflected position, the outer lateral surfaces of carrier 140 may be co-planar to, recessed within, and/or extend beyond the outer lateral surface of housing portions 122A and 122B, respectively. In some embodiments, there is no retention feature included in housing 120 to limit an amount of relative movement between carrier 140 and housing 120 and, correspondingly, an amount of lateral deflection of flexure 160. In other embodiments, as shown, for example, in the embodiment of FIGS. 7A-7C, housing portions 122 may extend beyond, and partially enclose, the outer lateral surfaces of carrier 140 within housing 120, such that an amount of lateral movement of carrier 140 within housing 120 is bounded by a gap between the outer lateral surfaces of carrier 140 and the corresponding inner lateral surfaces of housing portions 122A and 122B. In some embodiments, an amount of lateral movement of carrier 140 relative to housing portion 122A or 122B may not be limited by housing 120 in one direction, but may be limited in another direction.

Figure 2A:
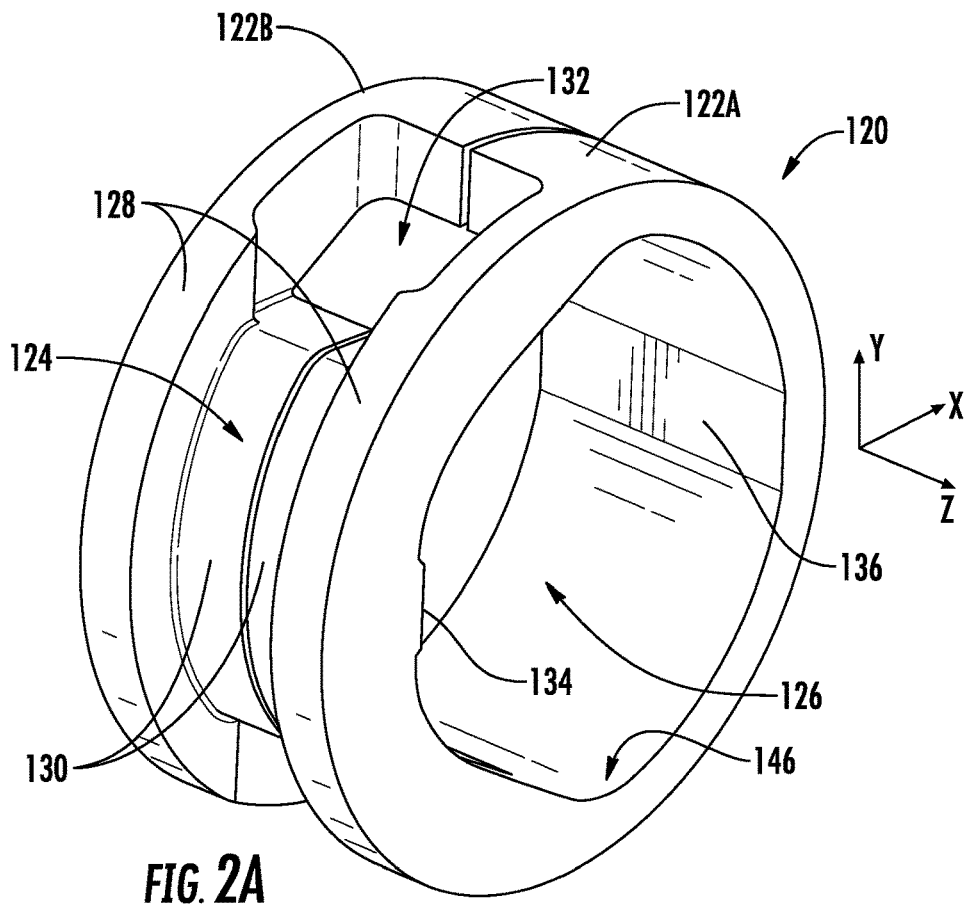
FIG. 2A shows a housing for the compliant engine mount of FIG. 1.

Housing 120 of mount 100 is shown in FIG. 2A. As shown, housing 120 has two portions 122A and 122B. Housing 120 may be designed to be substantially symmetric, thereby being configured to be installed to support engines on either side of an aircraft, or housing 120 may be designed such that mount 100 can only be used in one orientation (e.g., only one side of an aircraft). Since housing 120 is symmetric, the structures of housing portions 122A and 122B are mirrored about a plane defined by housing seam, generally designated 124. Over one radial portion of housing 120, the left side as illustrated herein, housing portions 122A and 122B each have a recessed housing-flexure support surface (HFSS) 130 that is located radially inward from the outer profile of housing 120, thus allowing flexure 160 to not extend radially beyond the outer profile of housing 120. When in an assembled state, the width (measured in the z-direction) of HFSS 130 is defined by the distance between housing flanges 128, which prevent any significant degree of displacement of flexure 160 relative to housing 120 in the z-direction. HFSS 130 is shown as being substantially continuous and uninterrupted between flexure passages, generally designated 132, which are formed through a full radial thickness of housing 120 to allow for flexure 160 to pass therethrough and interface and/or engage with carrier 140. In some embodiments, HFSS 130 and housing flanges 128 can be formed with some portions thereof not being present, thereby allowing for reduction in mass of mount 100.

Still referring to FIG. 2A, embodiments of housing snubbing surfaces 134 and 136 formed in housing 120 are illustrated, both in the reverse thrust direction (e.g., negative x-direction) and the forward thrust direction (e.g., positive x-direction). These housing snubbing surfaces 134 and 136 can be formed at any suitable position on housing 120 in order to limit deflection or displacement of carrier 140 relative to housing 120 in any radial direction. When carrier 140 is located so as to be in contact with either of the housing snubbing surfaces 134 and 136 shown, this contact provides a mechanical force-transmission "short circuit" between carrier 140 and housing 120, such that forces and vibrations from the trunnion pin (not shown) into carrier 140 can pass directly into housing 120 without having to pass through flexure 160. These housing snubbing surfaces 134 and 136 are configured to prevent damage from excess deflection when the forces transmitted to carrier 140 exceed those anticipated and designed for during normal operation of the aircraft. In some embodiments, other snubbing surfaces may be included that are configured to, for example, limit displacement of carrier 140 relative to housing 120 in the vertical direction (e.g., the y-direction).

Figure 2B:
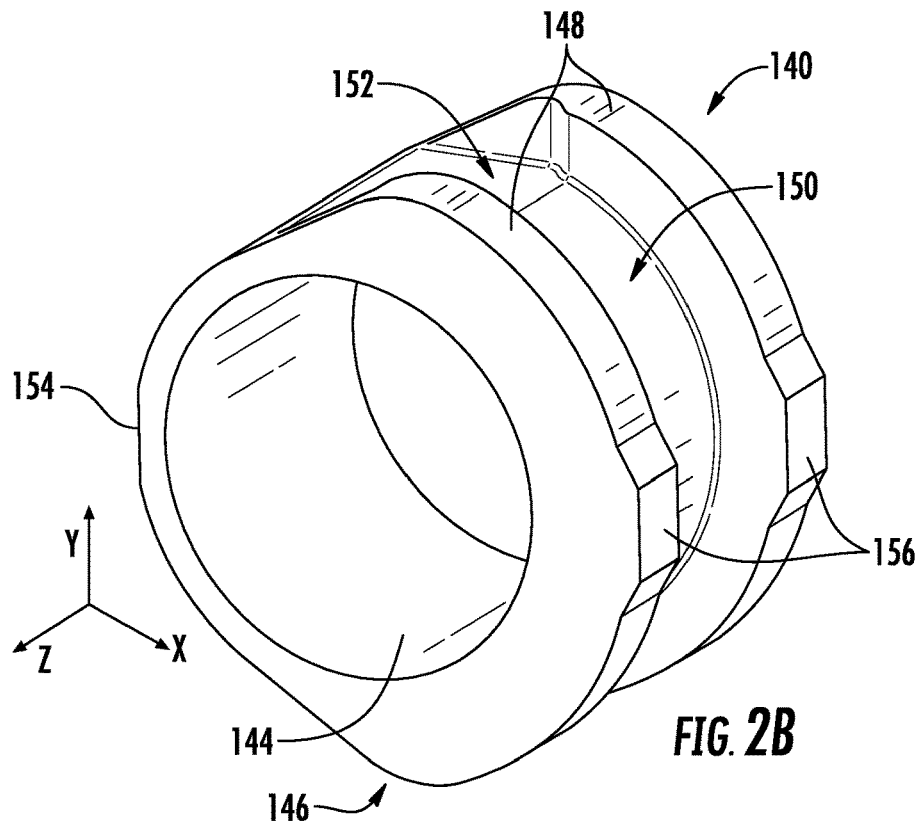
FIG. 2B shows a carrier for the compliant engine mount of FIG. 1.

In FIG. 2B, carrier 140 of mount 100 is shown. In this embodiment, carrier 140 is formed as a single piece that is configured to be inserted within cavity 126 of housing 120. The orientation of carrier 140 within housing 120 is positively defined by one or more keyed features 146. Similar to the description of housing 120, carrier 140 has a carrier-flexure support surface (CFSS) 150 that is substantially the same width, measured between the carrier flanges 148 in the z-direction, as the HFSS 130. Taken together, carrier flanges 148 and CFSS 150 define a portion of flexure channel 152, in which flexure 160 is located when in an assembled state. Carrier 140 has a cylindrical inner race 144, defined by a hole 142 through a thickness of carrier 140, measured in the z-direction. Other profile shapes of inner race 144 are contemplated, as are inner races 144 that are not a full thickness of carrier 140. Hole 142 is configured to receive and interface with a trunnion pin (not shown) at inner race 144. The trunnion pin (not shown) is connected to, for example, an aircraft frame or an aircraft engine, and is configured, through a connection with mount 100, to provide a stiffness in one or more radial directions (e.g., x- and y-directions) by reacting the forces transmitted from the trunnion pin (not shown) into carrier 140, while still allowing for a lower stiffness in the axial direction (e.g., the z-direction) of the trunnion pin (not shown) compared to the stiffness provided in the one or more radial directions of mount 100. Mount 100 is configured to provide a higher stiffness in one or more radial directions, such as vertical and thrust directions of an aircraft on the ground and/or during a cruise phase of flight, than a stiffness provided in an axial direction, such as a direction aligned with a trunnion pin (not shown) inserted into mount 100 to support, for example, an aircraft engine. In some embodiments, the stiffness provided by mount 100 in the one or more radial directions, including the thrust and/or vertical directions as defined hereinabove, can be at least an order of magnitude, i.e., greater by a factor of at least ten, than a stiffness provided by mount 100 in the axial direction, which is aligned with the longitudinal axis of the trunnion pin (not shown). In some embodiments, the stiffness provided by mount 100 in the one or more radial directions, including the thrust and/or vertical directions as defined hereinabove, can be at least two orders of magnitude greater, i.e., greater by a factor of at least 100, than the stiffness provided by mount 100 in the axial direction, which is aligned with the longitudinal axis of the trunnion pin (not shown). In some embodiments, the stiffness provided by mount 100 in the one or more radial directions, including the thrust and/or vertical directions as defined hereinabove, can be at least three orders of magnitude greater, i.e., greater by a factor of at least 1,000, than the stiffness provided by mount 100 in the axial direction, which is aligned with the longitudinal axis of the trunnion pin (not shown).

Carrier 140 has snubbing surfaces 154 and 156 in the forward thrust direction (e.g., positive x-direction) and the reverse thrust direction (e.g., negative x-direction), respectively. These carrier snubbing surfaces 154 and 156 correspond to and interact with the respective housing forward thrust and reverse thrust snubbing surfaces 134 and 136, which have been described above with respect to FIG. 2A. As noted above, when reverse thrust is transmitted from the engine to mount 100 via carrier 140, carrier 140 and housing 120 directly contact each other at their respective reverse thrust snubbing surfaces 134 and 154. Similarly, when a forward thrust force that exceeds the design parameters of mount 100 is transmitted to mount 100 via carrier 140, carrier 140 contacts housing 120 at the respective forward thrust snubbing surfaces 136 and 156, thus preventing excessive and potentially damaging deformation of flexure 160 by excessive displacement of carrier 140 relative to housing 120.

Figure 3:
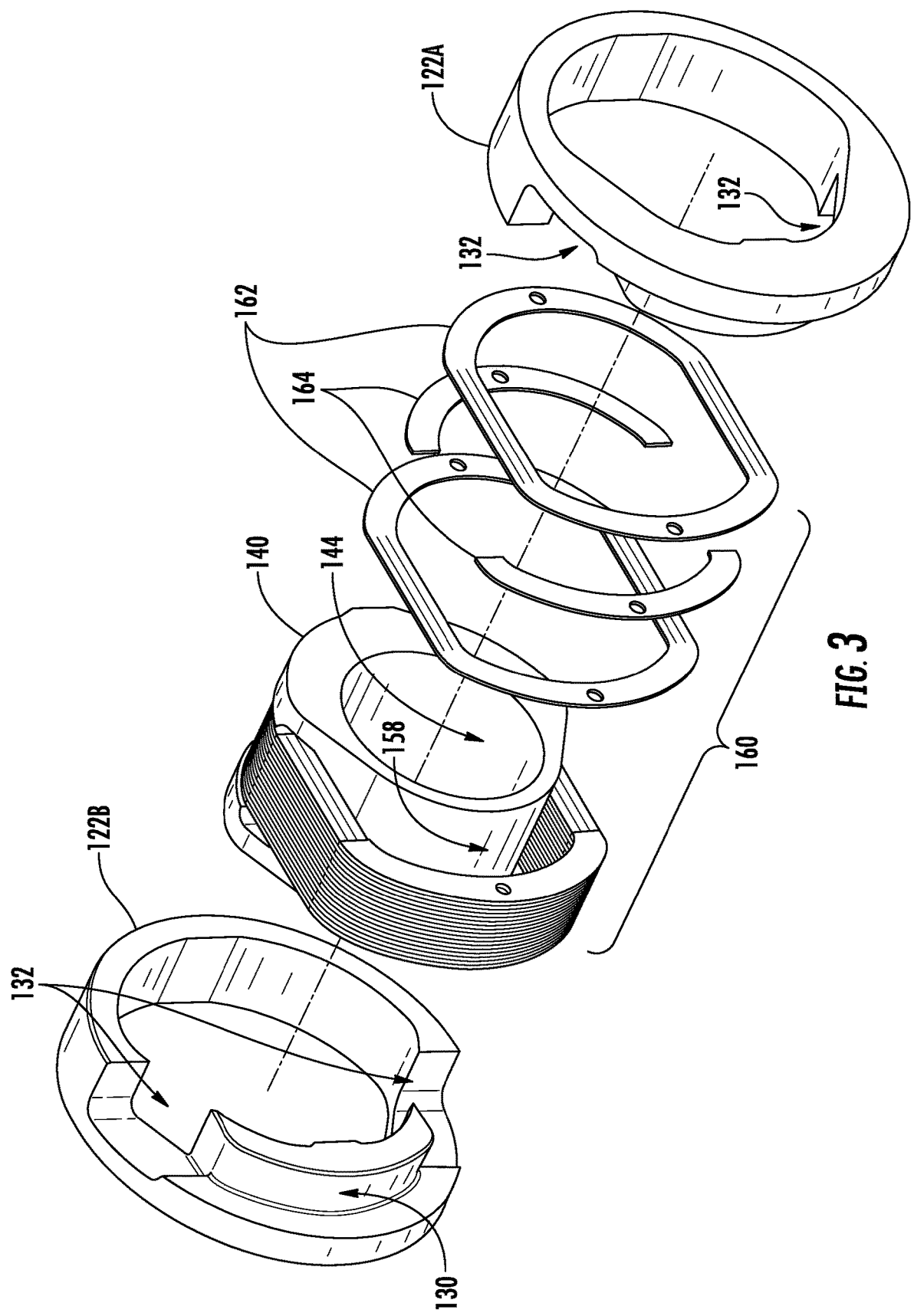
FIG. 3 is an exploded assembly view of the compliant engine mount of FIG. 1.

Referring to FIG. 3, an exploded view of mount 100 is shown. While this embodiment can be installed with either portion 122A or portion 122B in an outboard position, portion 122B of housing 120 will be referred to herein as defining the "rear" of mount 100 for ease of explanation. As such, portion 122B of housing 120 is located at the rear of mount 100, while housing portion 122A is at the front of mount 100. Next, flexure 160 is shown being arranged around and in contact with carrier 140 at the CFSS (see, e.g., 150, FIG. 2B), such that a gap 158 exists at the opposite end of flexure 160 between carrier 140 and flexure 160 for insertion of the HFSS 130 of portions 122A and 122B of housing 120 into gap 158. In some embodiments, gap 158 is smaller than HFSS 130 of portions 122A and 122B of housing 120, such that, after assembly, flexure 160 is pre-tensioned so carrier 140 and housing 120 are in contact at their respective reverse thrust snubbing surfaces 134 and 154 when no external force, for example, a forward thrust force is transmitted to carrier 140.

Still referring to FIG. 3, the structure of flexure 160 is shown. Flexure 160 is composed of flexing layers 162 in a shape of a geometric "stadium". As those skilled in the art know, a geometric "stadium" is defined as "a rectangle with top and bottom lengths whose ends are capped off with semicircles of radius r." (See, e.g., Wolfram MathWorld). These flexing layers 162 are spaced apart from adjacent flexing layers 162 at the semicircular ends of the stadium by spacers 164. Other shapes for flexing layers 162 and spacers will be readily understood by those having ordinary skill in the art. In the embodiment shown, flexing layers 162 and spacers 164 are made of a metal, but other suitable materials may be substituted depending on the forces being reacted. In some embodiments, spacers 164 may be made of a different material, e.g., plastic, than flexing layers 162 to reduce the mass of mount 100. Spacers 164 have a shape corresponding to the curved ends of flexing layers 162, but can be formed in any suitable shape and arranged in any suitable configuration to ensure that flexing layers 162 are spaced apart from each other in the area of HFSS 130 and CFSS 150 to maintain a substantially constant and/or uniform spacing between adjacent flexing layers 162 in the flexing region of flexure 160 (see, e.g., 166, FIG. 4). As illustrated, both flexing layers 162 and spacers 164 are configured to have holes 172 formed therein, in which dowels can be inserted for proper alignment of spacers 164 and flexing layers 162 during assembly. However, any alignment device in lieu of using dowels is anticipated as meeting the requirements of this invention. Flexure 160 of FIG. 3 is illustrated without elastomeric material 170 shown in FIG. 1 to illustrate the internal structure of flexure 160, but any suitable elastomeric material 170 may be used, depending on the level of vibration attenuation needed in any given application.

It should be noted that the semicircular end portions of each flexing layer 162, as well as spacers 164, as well as the first and second ends of the flexure, have a substantially similar profile and are in substantially circumferential contact with HFSS 130 or CFSS 150, respectively, such that some or all of the straight portions (e.g., upper and lower portions) of flexing layers 162 are not in direct contact with either carrier 140 or housing 120, but are instead largely "floating" between the curved semicircular ends of the stadium-shaped flexing layers 162. The semicircular ends of flexure 160 are fixed between housing flanges 128 or carrier flanges 148, respectively, thereby preventing any movement of the part of flexure 160 held between housing flanges 128 from moving in the z-direction relative to housing 120. As such, an axial force will cause flexing layers 162 to bend (see, e.g., FIGS. 4B and 4C). When a force in the forward thrust direction is transmitted to carrier 140, the straight portions of each flexing layer 162 reacts this force in tension. Once the force is of a sufficient magnitude to overcome any pre-tension applied to hold carrier 140 in contact with housing 120 at the reverse thrust snubbing surfaces 134 and 154, the straight portions of flexing layers 162 become strained and are elongated in tension, such that carrier 140 is not in direct contact with housing 120. This allows carrier 140 to more easily move in the z-direction relative to housing 120 with lower stiffness than conventionally known center trunnion-style mounts. This relative movement between carrier 140 and housing 120 in the z-direction is achieved by each flexing layer 162 of flexure 160 bending in the z-direction as carrier 140 moves relative to housing 120 in the z-direction.

In the present embodiment, a quantity 20 flexing layers 162 are used in flexure 160. However, the quantity, dimensions, and shape of flexing layers 162 can be selected depending on the application. The use of a lower quantity of flexing layers 162 will reduce stiffness in all directions. The number of flexing layers 162 required can vary widely from one application to the next, depending on the strength requirements and the flexibility. Ideally, to provide a minimum axial stiffness, a larger quantity of thinner flexing layers 162 is preferred compared to a lesser quantity of thicker flexing layers 162. The quantity of flexing layers 162 used in flexure 160 can be selected from a wide range, from as few as approximately four to as many as 50 or more, so long as relative axial movement between flexure 160 and housing 120 and flexure 160 and carrier 140 are prevented.

Figure 4A:
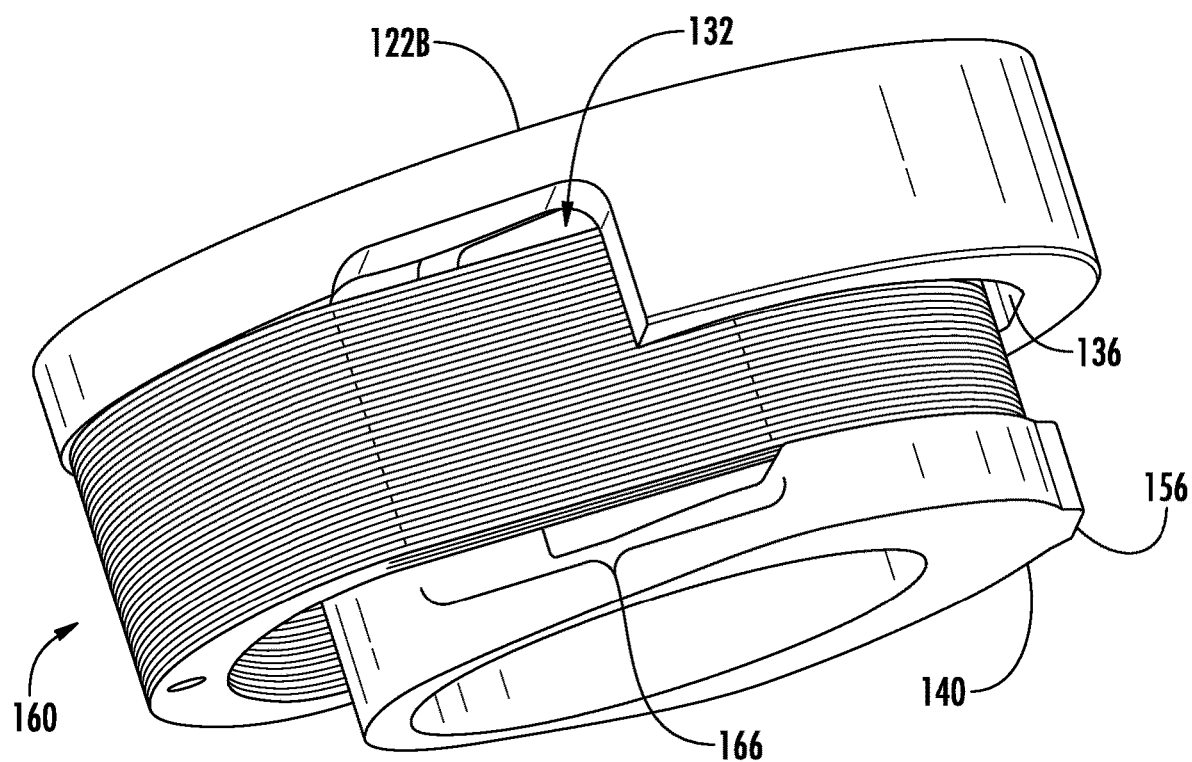
FIG. 4A is another view of the compliant engine mount of FIG. 1, with a part of the housing removed to show the internal structures of the compliant isolator.

Referring to FIG. 4A, another view of mount 100 is shown, but without housing portion 122B installed. Spacers 164 only extend as far as housing flanges 128 and carrier flanges 148, thereby defining a flexing region 166 of flexure 160 between housing flanges 128 and carrier flanges 148. In flexing region 166, the portion of flexure 160 secured with housing 120, which is installed within a cylindrical socket of the supporting frame, is held substantially stationary, while flexure 160 deforms in flexing region 166 as carrier 140 moves relative to housing 120 in response to forces received at carrier 140. It is possible to operate mount 100 in the configuration shown in FIG. 4A, without elastomeric material 170 formed around and in flexure 160, thereby further reducing the stiffness in the axial direction (e.g., the z-direction). However, the vibration attenuation levels may be marginally reduced, as the attenuation of the high frequency "ringing" modes of flexing layers 162 will not be provided when elastomeric material 170 is omitted.

Figure 4B:
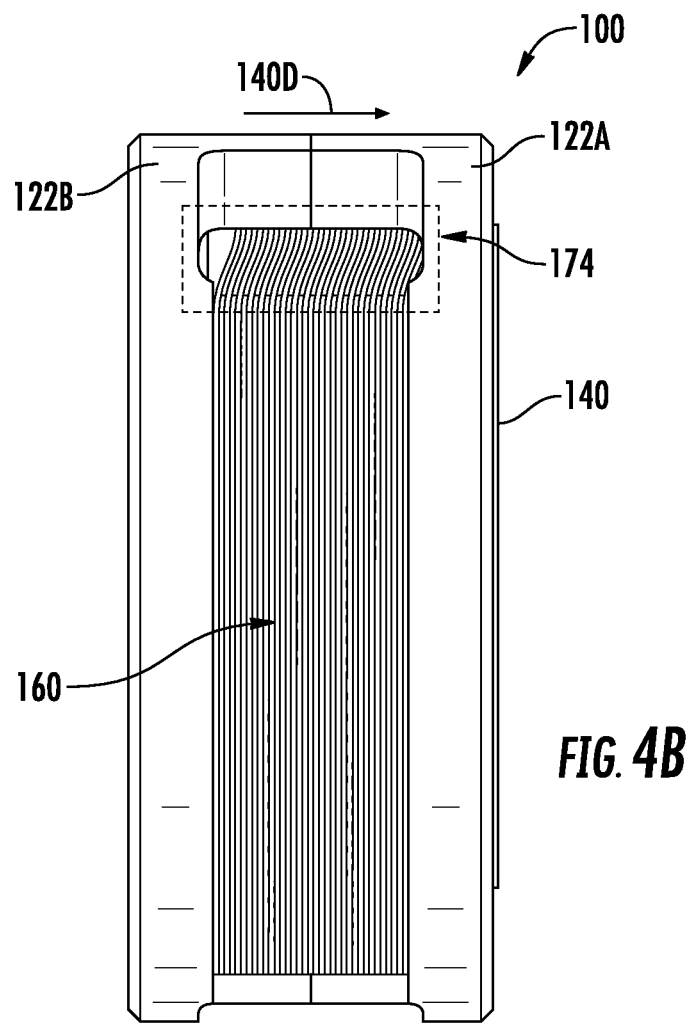
FIG. 4B is a side view of the compliant engine mount of FIG. 1, showing the bending of the flexure when the carrier is displaced laterally relative to the housing.
Figure 4C:
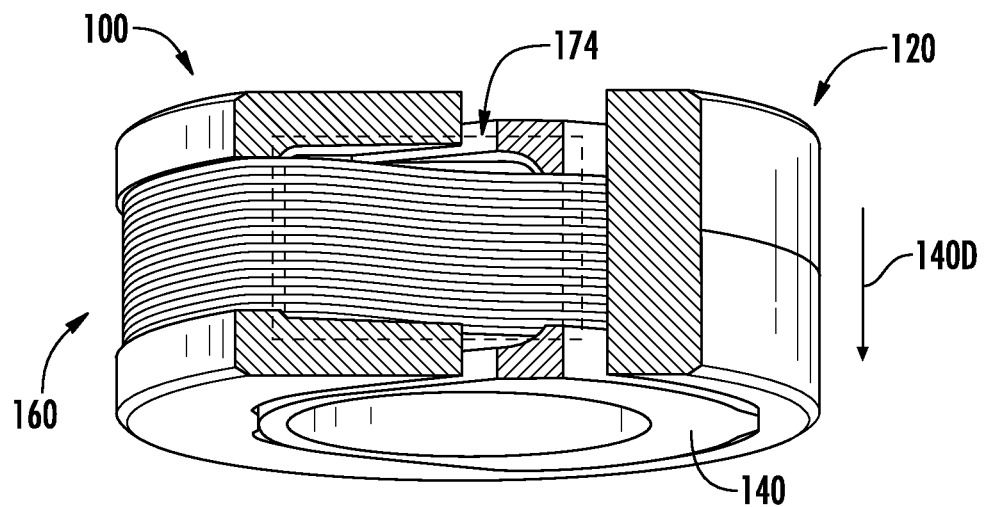
FIG. 4C is a top sectional view of the compliant engine mount of FIG. 1, showing the bending of the flexure when the carrier is displaced laterally relative to the housing.

FIGS. 4B and 4C illustrate how flexing layers 162 of flexure 160 undergo a bending deflection in the axial direction when carrier 140 is moved in the axial direction relative to housing 120. Elastomeric material 170 is omitted in this view. As carrier 140 is axially deflected in the direction indicated by 140D, flexure 160 correspondingly deforms in bending, the degree of bending increasing as the magnitude of the axial displacement of carrier 140 increases relative to housing 120. Bending of flexure 160 is shown in region 174 of FIGS. 4B and 4C. Bending of flexure 160 occurs substantially uniformly on the top and bottom portions of flexure 160.

Figure 5A:
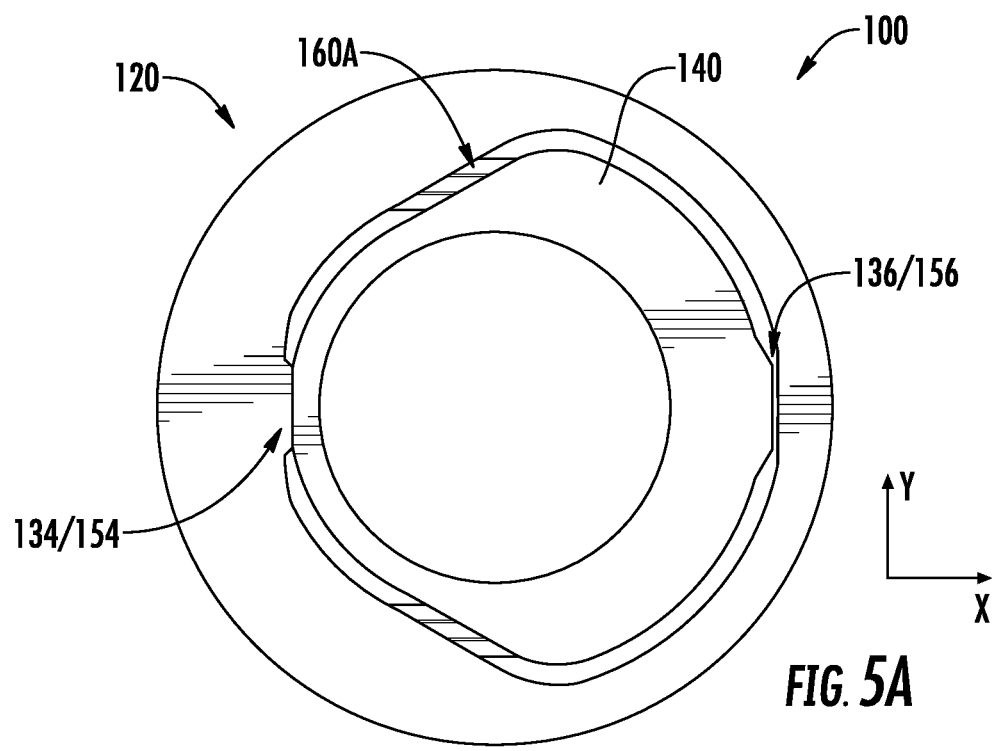
FIG. 5A is a front plan view of the compliant engine mount of FIG. 1.
Figure 5B:
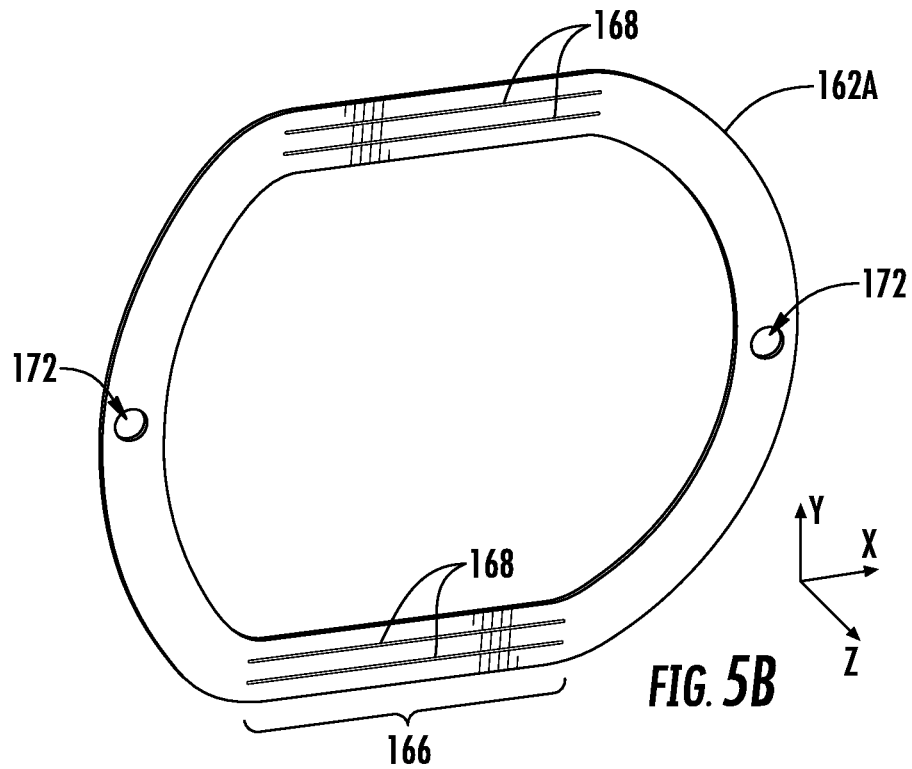
FIG. 5B shows a flexure layer shown in the compliant engine mount of FIG. 1.

Referring to FIGS. 5A and 5B, an example embodiment of slotted flexing layers 162A are illustrated. In FIG. 5A, which is a front plan view of mount 100, slotted flexure 160A is visible between housing 120 and carrier 140. It can be seen that, since no thrust force is being reacted by carrier 140, flexure 160A is pre-tensioned such that carrier 140 is directly in contact with housing 120 at the reverse thrust snubbing surfaces 134 and 154. FIG. 5B is a view of flexing layer 162A with solid semicircular end portions, other than holes 172, but with two slots 168 running the length of each straight portion of flexing layer 162A in flexing region 166. In some embodiments, each slot is at least a partial length of the upper or lower portion in which such slot is formed. While two slots 168 are illustrated in each straight portion, any number of slots 168 may be used, including using different numbers of slots 168 on the top straight portion than the bottom straight portion. Slots 168 are used in order to provide lower stiffness in the vertical direction (e.g., the y-direction) than would be true for an otherwise identical flexing layer without any such slots, such as a solid flexing layer, see 162B, FIG. 6B. Slots 168 are configured to reduce the stiffness in the vertical direction by reducing the thickness of the bending cross-section of the straight portions with respect to the vertical direction. Because the slots formed are very thin, the cross-sectional area of the flexing layers reacting the thrust forces in tension is negligibly impacted and, accordingly, the stiffness in the radial thrust direction is only negligibly reduced. By controlling the number of slots 168 formed in the flexing layers 162A, the stiffness in the vertical direction can be selected precisely based on the requirements of the particular application.

Figure 6A:
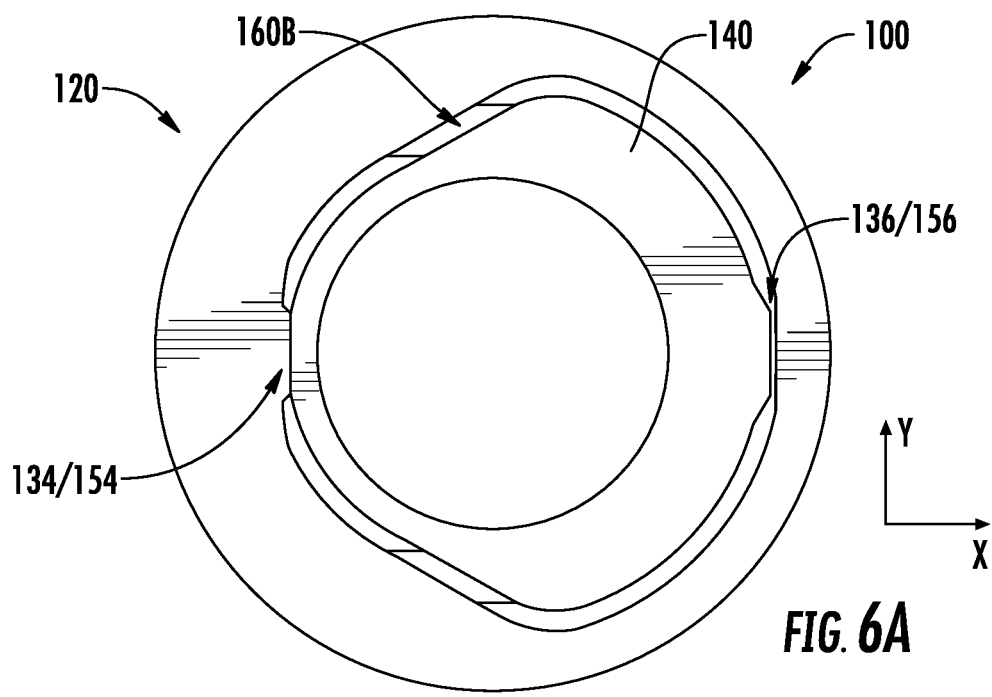
FIG. 6A is a front plan view of an example embodiment of a compliant engine mount.
Figure 6B:
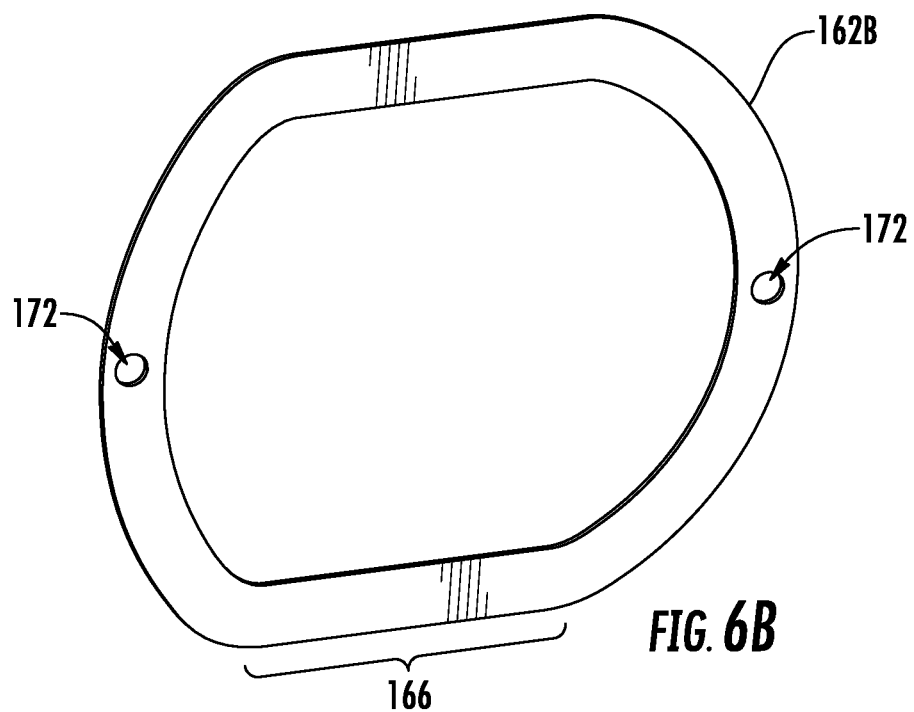
FIG. 6B shows a flexure layer shown in the compliant engine mount of FIG. 6A.

FIGS. 6A and 6B correspond to the illustrations shown in FIGS. 5A and 5B, but with no slots formed in the straight portions of the solid flexing layer 162B, thereby providing the maximum stiffness possible in the vertical direction. The maximum stiffness may still be changed by altering other aspects of flexing layers 162B.

Figure 7A:
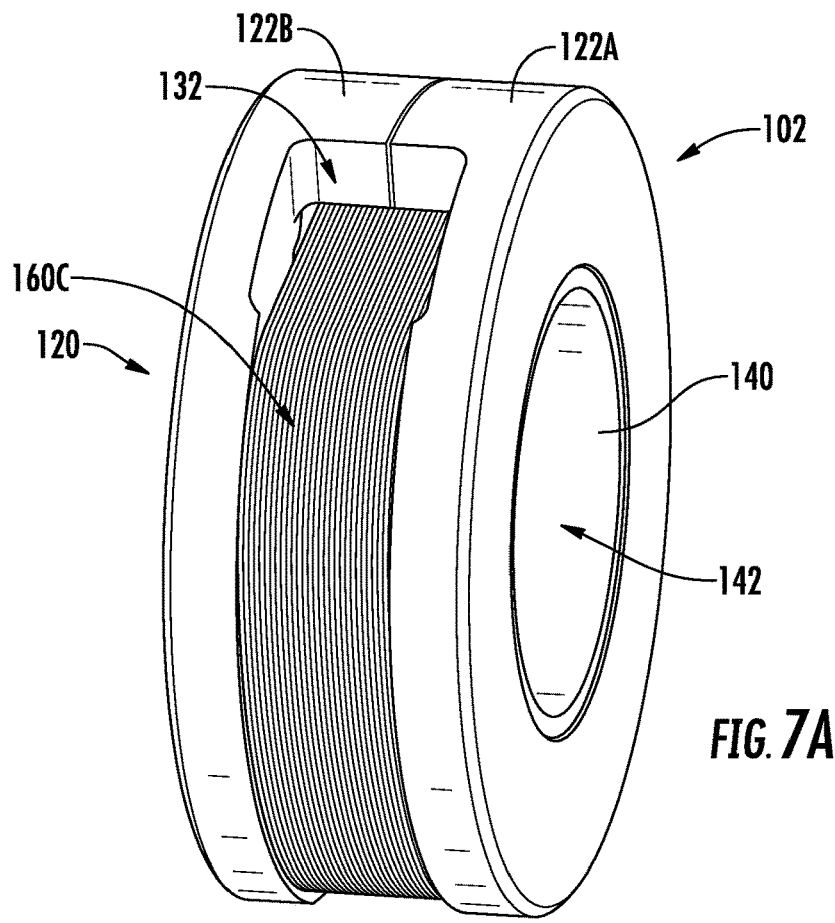
FIG. 7A is a partial cross-sectional view of an example embodiment of a compliant engine mount, with a part of the housing removed to show the internal structures of the compliant isolator.
Figure 7B:
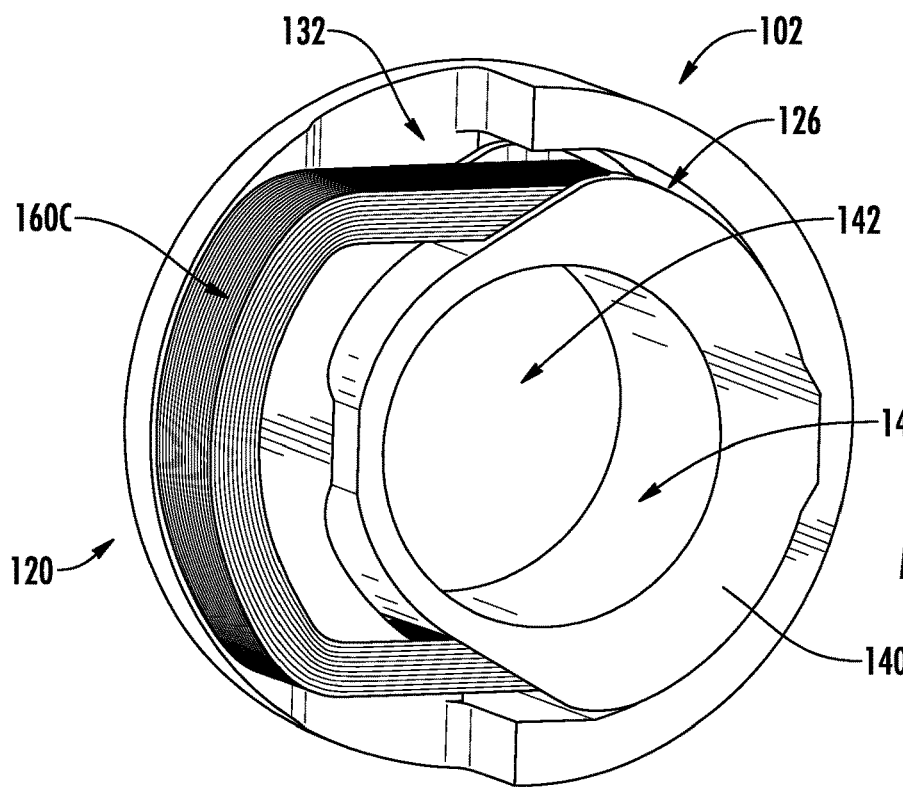
FIG. 7B is an internal view the compliant engine mount of FIG. 7A.
Figure 7C:
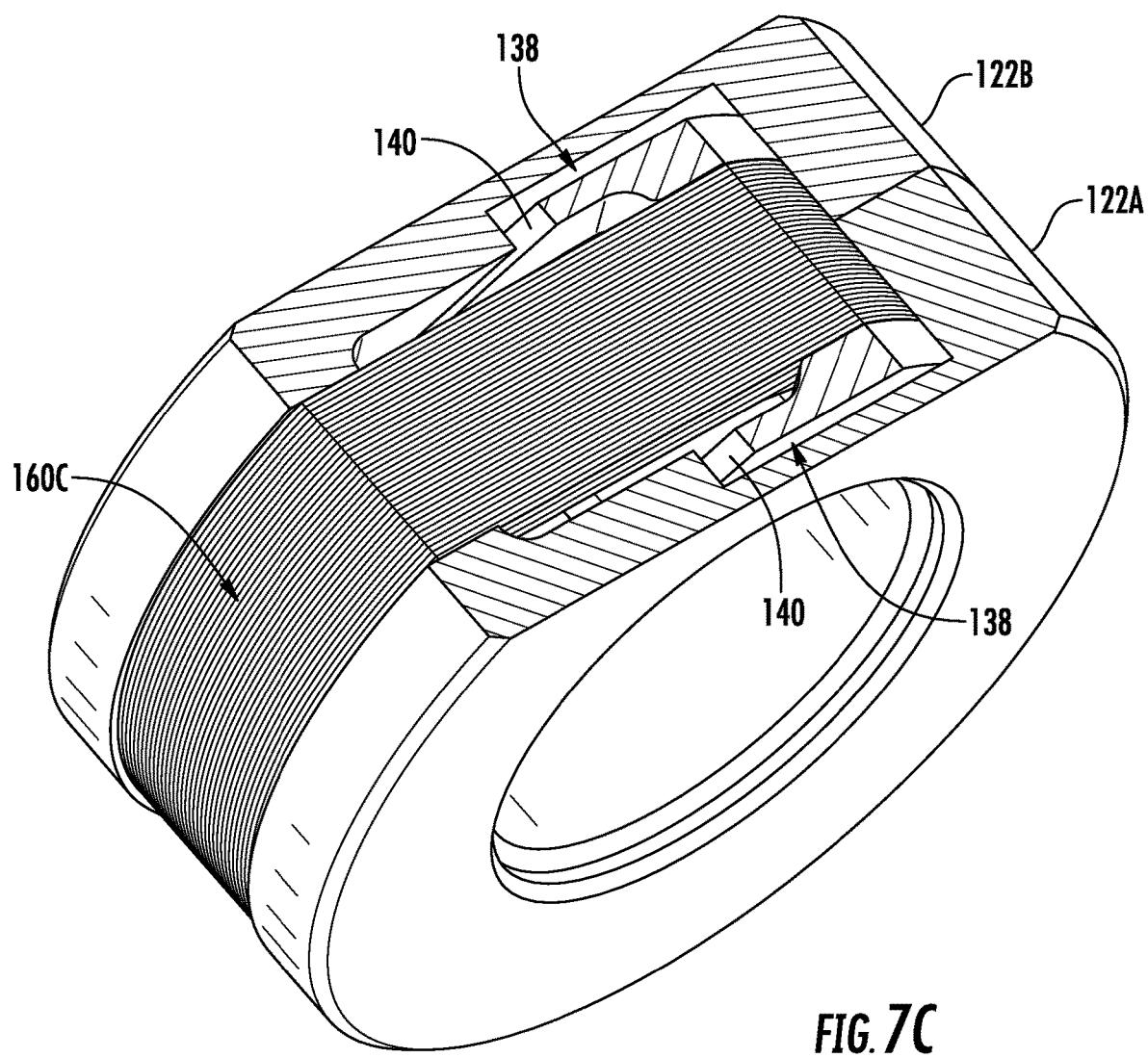
FIG. 7C is a top sectional view of the compliant engine mount of FIG. 7A.

Referring to FIGS. 7A, 7B, and 7C, another example embodiment of a compliant engine mount, generally designated 102 is shown. Mount 102 illustrated herein constructed in a substantially similar manner and has components that are substantially similar to those illustrated in the embodiment in FIG. 1, but has a wire flexure 160C comprised of a wire wrapped concentrically around carrier 140 and housing 120 in place of the individual flexing layers 162B shown, for example, in FIG. 6B. By using a wrapped wire flexure 160C, mount 102 is configured to provide substantially similar low-stiffness values in two directions, the axial and vertical radial directions. In some embodiments, the wire is wound around half-spools, one of which is attached to carrier 140 and another of which is attached to housing 120. In this embodiment, the wire is made from metal and the number of times the wire is wrapped can range from, for example, as few as 10 to 1,000 or more, depending on the forces being reacted in a given application. The dimensions of flexure passages 132 and flexure channel 152 formed in the housing and carrier, respectively, as well as the thickness (e.g., gauge) of the wire, will largely determine the maximum number of times the wire can be wrapped for any particular mount design. Other materials capable of being wrapped as described and shown herein may be used, depending on the forces and other design considerations (e.g., service life, deflection, etc.) for mount 102. In some embodiments, wire flexure 160C comprises an elastomeric material that forms the wrapped wire portions the wire flexure 160C, depending on the forces being reacted by mount 102. In some other embodiments, a lower strength metallic material, such as, for example, copper, may be used for the wire windings of wire flexure 160C.

As was described relative to the example embodiment of mount 100 in FIG. 1, in some embodiments mount 102 has an elastomeric material surrounding at least a portion of wire flexure 160C. This elastomeric material has been omitted from the illustration of mount 102 in FIGS. 7A, 7B, and 7C for reasons of clarity. In some embodiments, the elastomeric material is molded by injecting the elastomeric material in liquid form in and around wire flexure 160C after the assembly thereof. In other embodiments, the elastomeric material can be formed as layers that are incorporated between each layer of wire flexure 160C to provide internal damping aspects to wire flexure 160C. This provides a wear-resistant shear connection between each winding of the wrapped wire of wire flexure 160C. In yet another embodiment, wire flexure 160C is encapsulated by a pourable potting compound, adhesive, or epoxy, after assembly of the device. The elastomeric material also provides an environmental barrier for wire flexure 160C, preventing particulate and liquid infiltration, which can lead to corrosion and premature degradation of performance of wire flexure 160C, thereby reducing the useful service life of mount 102. In some embodiments, the individual wires of wire flexure 160C may be coated in the elastomeric material during assembly of mount 102. In some such embodiments, the elastomeric material can be applied to the wire of wire flexure 160C during the wrapping process of forming wire flexure 160C. In some such embodiments, the wire of wire flexure 160C passes through the elastomeric material, which is in its uncured state, as the wire is being wrapped around the components of the housing 120 and the carrier 140 to form wire flexure 160C. In some embodiments, the elastomeric material is formed and/or molded such that an outer surface of the elastomeric material is substantially the same height as the outer circumferential surfaces of housing portions 122A and 122B, such that mount 102 has a substantially smooth and/or continuous outer annular surface.

A lateral gap, generally designated 138, is shown in FIG. 7C. Lateral gap 138 defines the maximum amount of lateral deflection possible for carrier 140 within housing 120. As such, lateral gap 138 is the distance between an outer lateral surface of carrier 140 and an adjacent inner lateral surface of housing 120, such as, for example, housing portions 122A and 122B. Accordingly, lateral gap 138 is dimensioned based on the degree of lateral deflection of carrier 140 within housing 120 for a particular implementation of mount 102. When carrier 140 moves a distance laterally towards either of housing portions 122A and 122B such that lateral gap becomes a "zero" value, the compliant aspects of mount 104 are effectively "short circuited" and mount 104 acts substantially similar to a conventional hard mount device, without any further lateral movement possible between carrier 140 and housing portion 122A or 122B in the direction towards which carrier 140 is in contact with housing portion 122A or 122B. Lateral gap 138 is a "zero" value when any lateral surface of carrier 140 makes physical contact with either of housing portions 122A and 122B. When carrier 140 is no longer in contact with housing portion 122A or 122B, mount 104 will again operate as a compliant mount, allowing for relative movements between carrier 140 and housing 120.

Mount 102 is configured to provide a higher stiffness in one or more radial directions, such as thrust and/or vertical directions of an aircraft on the ground and/or during a cruise phase of flight, than a stiffness provided in an axial direction, such as a direction aligned with a trunnion pin (not shown) inserted into mount 102 to support, for example, an aircraft engine. In some embodiments, the stiffness provided by mount 102 in the one or more radial directions, including the thrust and/or vertical directions as defined hereinabove, can be at least an order of magnitude, i.e., greater by a factor of at least ten, than a stiffness provided by mount 102 in the axial direction, which is aligned with the longitudinal axis of the trunnion pin (not shown). In some embodiments, the stiffness provided by mount 102 in the one or more radial directions, including the thrust and/or vertical directions as defined hereinabove, can be at least two orders of magnitude greater, i.e., greater by a factor of at least 100, than the stiffness provided by mount 102 in the axial direction, which is aligned with the longitudinal axis of the trunnion pin (not shown). In some embodiments, the stiffness provided by mount 102 in the one or more radial directions, including the thrust and/or vertical directions as defined hereinabove, can be at least three orders of magnitude greater, i.e., greater by a factor of at least 1,000, than the stiffness provided by mount 102 in the axial direction, which is aligned with the longitudinal axis of the trunnion pin (not shown). Regardless of the degree to which a stiffness provided by mount 102 in the one or more radial directions is greater than a stiffness in the axial direction, as described hereinabove, mount 102 provides, in some such embodiments, substantially a same stiffness, e.g., within 25%, within 10%, within 5%, within 2%, or within 1%, in the vertical (e.g., y-direction) and axial (e.g., z-direction) directions.

Referring to FIGS. 8A-8E, another example embodiment of a compliant engine mount, generally designated 104, is illustrated, this mount 104 being configured to accommodate potential "cocking" deflections which could be induced during installation or during normal operation (e.g., deformation or motion of the engine relative to the airframe) without overloading any of the flexing layers 162 of flexure 160. The features disclosed herein regarding the example embodiment of FIGS. 8A-8E can also be applied to embodiments (e.g., mount 102) having the wrapped wire flexure 160C. During periods of high thrust (e.g., during takeoff), it is not uncommon for the engine to apply sufficient thrust forces for the trunnion pin (not shown) to cause carrier 140 to begin to deform and/or bend in the direction of the forward thrust. This rotation causes the outboard flexing layers 162 (e.g., the flexing layers 162 on the side of mount 104 closest to the engine) to undergo more stress and elongate to a greater degree than inboard flexing layers. This results in potentially uneven fatigue for the outboard flexing layers as compared to the inboard flexing layers, thereby significantly reducing the useful service life of mount 104 than if all flexing layers 162 were stressed at a more uniform level.

Figure 8A:
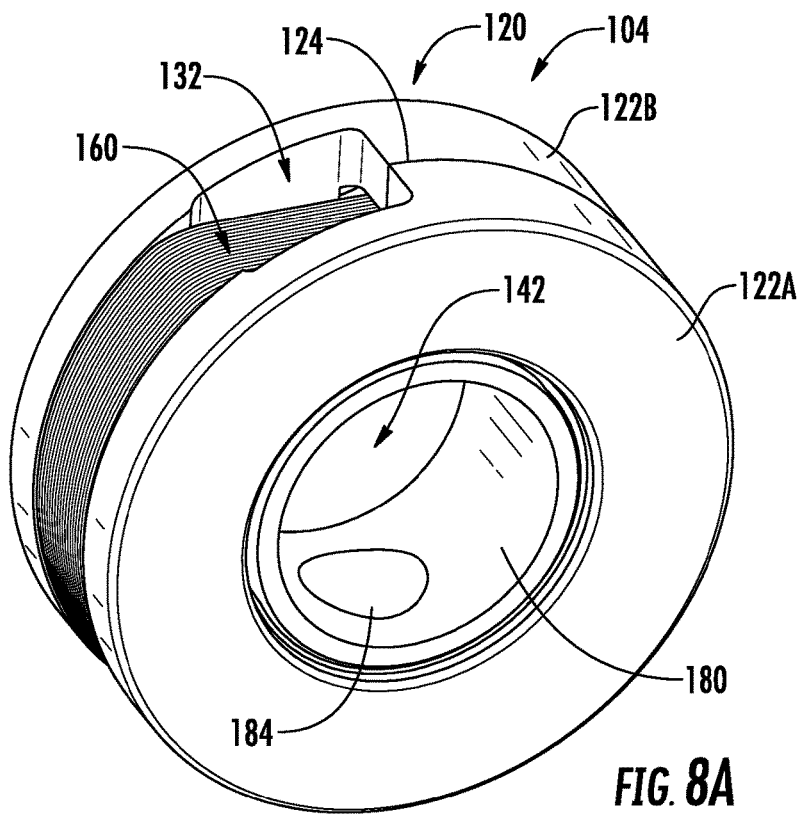
FIG. 8A shows an example embodiment of a compliant engine mount.
Figure 8B:
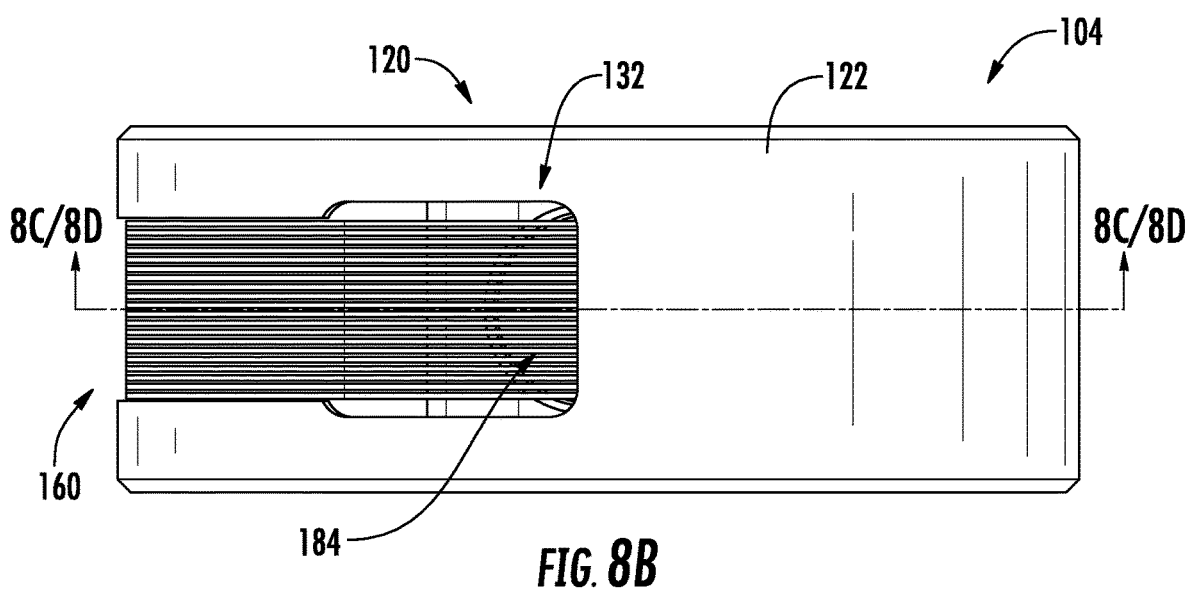
FIG. 8B is a top view of the compliant engine mount of FIG. 8A.
Figure 8C:
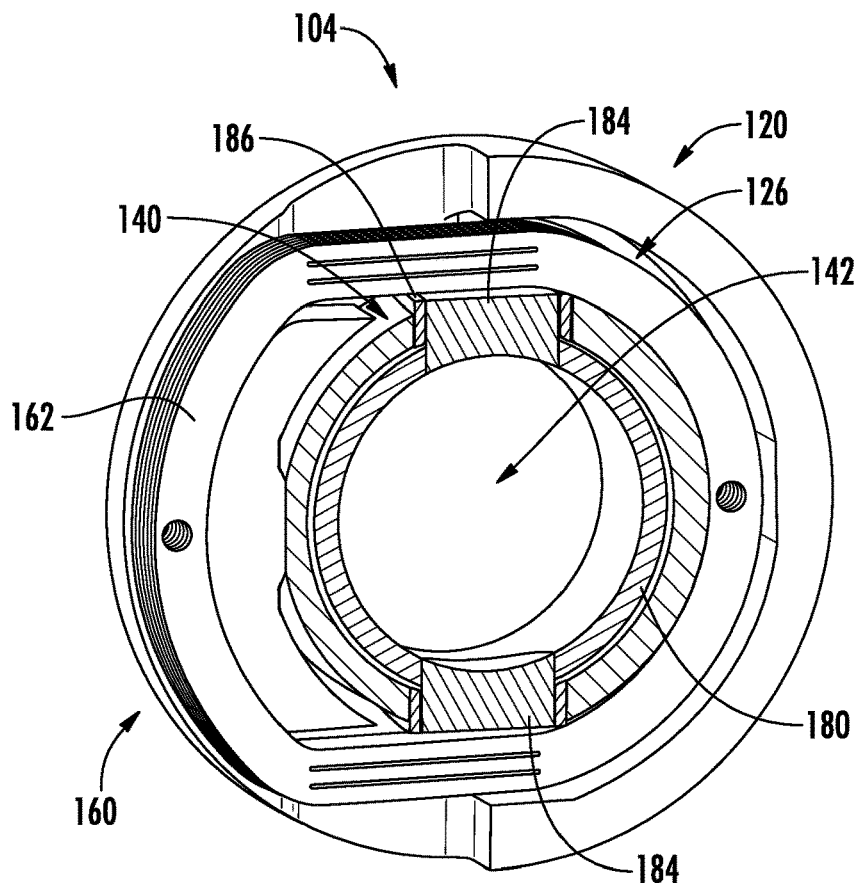
FIG. 8C is a cross-sectional view of the compliant engine mount of FIG. 8A, taken along the cut-line 8C/8D-8C/8D shown in the top view of the compliant engine mount in FIG. 8B.
Figure 8D:
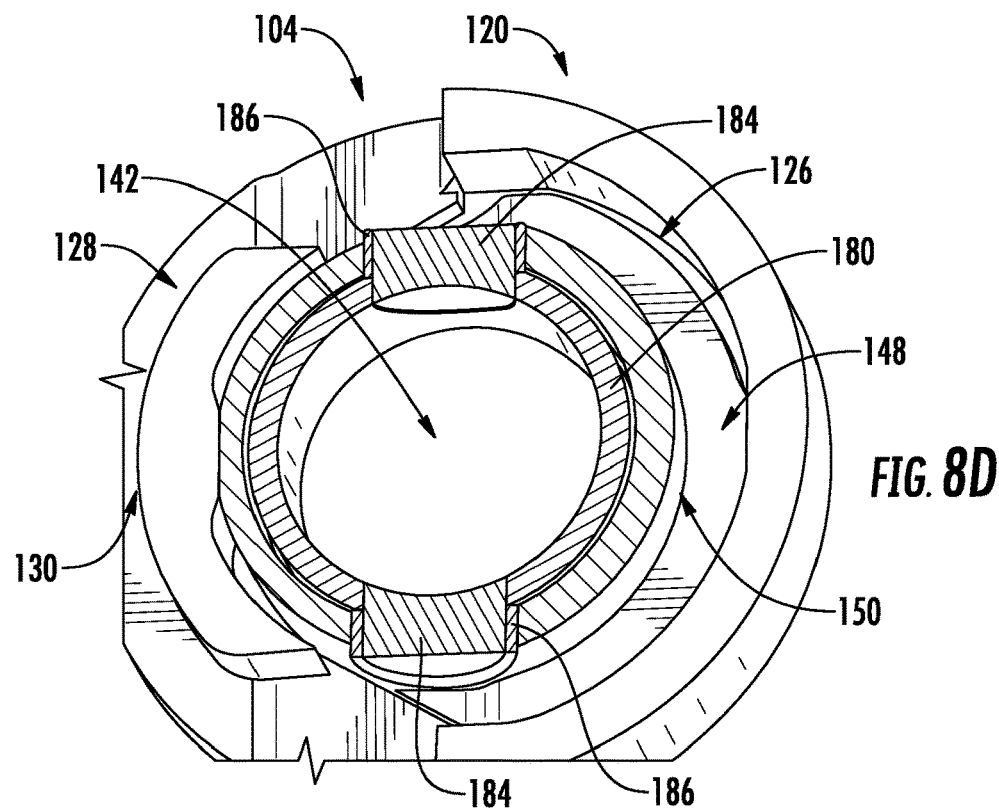
FIG. 8D is a cross-sectional view of the compliant engine mount of FIG. 8A, taken along the cut-line 8C/8D-8C/8D shown in the top view of the compliant engine mount in FIG. 8B, with the flexure removed to show the internal structures of the compliant engine mount.

FIGS. 8C and 8D are cross-sectional views of mount 104 to more clearly illustrate the internal features and construction of mount 104. The cross-sectional views of FIGS. 8C and 8D are taken along cut-line 8C/8D-8C/8D in FIG. 8B. In the view of FIG. 8B, housing seam 124 is not illustrated to more clearly show the position of cut-line 8C/8D-8C/8D, which is in a same plane as is housing seam 124, shown in FIG. 8A. As such, the example embodiment of FIGS. 8A-8E is designed such that carrier 140 has upper and lower sockets, in which an internal pivot member 180 with revolute pins 184 formed at the top and bottom thereof (e.g., extending in the positive and negative y-direction), such that internal pivot member 180 has a degree of rotational freedom in the cocking directions. The arrangement of revolute pins 184 and sockets can be reversed, so that revolute pins 184 are formed in carrier 140 and the corresponding sockets are formed in internal pivot member 180.

As is seen in FIGS. 8A-8E, the construction of mount 104 illustrated therein is substantially similar to that of mounts 100 and 102, shown in the embodiments of FIGS. 1-7B, but includes an internal pivot member 180 that is pivotably secured within carrier 140 by the insertion of revolute pins 184 within the sockets of carrier 140. The sliding surface of revolute pins 184 includes a friction-reducing and wear-resistant coating 186. In some embodiments, this coating 186 can be located on the sliding surface of the socket of carrier 140 or can even be omitted entirely. During normal use, internal pivot member 180 will pivot about the axis defined about revolute pins 184 to accommodate the cocking deflection before the loading of any portion of flexure 160 becomes substantially greater than any other portion of flexure 160. As is shown in FIG. 8E, a pivot gap 188 is present circumferentially between internal pivot member 180 and carrier 140. The dimension of pivot gap 188 defines the maximum amount of cocking deflection. Thus, a maximum amount or degree of pivoting movement of internal pivot member 180 within carrier 140 is defined by pivot gap 188 between an outer wall of the internal pivot member 180 and an inner race 144 defined by the hole 142 of the carrier 140. As such, pivot gap 188 defines the maximum amount or degree of pivoting movement of internal pivot member 180 relative to carrier 140 that can occur before an edge of internal pivot member 180 makes physical contact with carrier 140, thereby serving as a snubbing element for the cocking deflections to prevent excess cocking deflections of internal pivot member 188 relative to carrier 140. By pivoting to accommodate the cocking deflection, revolute pins 184 are configured to balance the externally applied thrust force to more evenly share this thrust load among all portions of flexure 160, regardless of the applied cocking deformation.

Mount 104 is configured to provide a higher stiffness in one or more radial directions, such as thrust and/or vertical directions of an aircraft on the ground and/or during a cruise phase of flight, than a stiffness provided in an axial direction, such as a direction aligned with a trunnion pin (not shown) inserted into mount 104 to support, for example, an aircraft engine. In some embodiments, the stiffness provided by mount 104 in the one or more radial directions, including the thrust and/or vertical directions as defined hereinabove, can be at least an order of magnitude, i.e., greater by a factor of at least ten, than a stiffness provided by mount 104 in the axial direction, which is aligned with the longitudinal axis of the trunnion pin (not shown). In some embodiments, the stiffness provided by mount 104 in the one or more radial directions, including the thrust and/or vertical directions as defined hereinabove, can be at least two orders of magnitude greater, i.e., greater by a factor of at least 100, than the stiffness provided by mount 104 in the axial direction, which is aligned with the longitudinal axis of the trunnion pin (not shown). In some embodiments, the stiffness provided by mount 104 in the one or more radial directions, including the thrust and/or vertical directions as defined hereinabove, can be at least three orders of magnitude greater, i.e., greater by a factor of at least 1,000, than the stiffness provided by mount 104 in the axial direction, which is aligned with the longitudinal axis of the trunnion pin (not shown). Regardless of the degree to which a stiffness provided by mount 104 in the one or more radial directions is greater than a stiffness in the axial direction, as described hereinabove, mount 104 provides, in some such embodiments, substantially a same stiffness, e.g., within 25%, within 10%, within 5%, within 2%, or within 1%, in the vertical (e.g., y-direction) and axial (e.g., z-direction) directions. Examples of such embodiments include a wire-wrapped flexure, such as is shown and described in FIGS. 7A-7C by flexure 160C.

As was described relative to the example embodiment of mount 100 in FIG. 1, in some embodiments mount 104 has an elastomeric material surrounding at least a portion of flexure 160, the elastomeric material being configured to reduce the transmission of vibrations and forces and also to provide environmental protection. This elastomeric material has been omitted from the illustration of mount 104 in FIGS. 8A-8D for reasons of clarity. In some embodiments, flexure 160 is entirely encapsulated in such an elastomeric material. In embodiments having the elastomeric material, such elastomeric material is configured to provide an environmental seal around the internal components of flexure 160, as well as to damp high frequency "ringing" modes of the individual flexing layers 162 of flexure 160. Vibration isolation and/or damping is provided primarily through the comparatively low stiffness aspect of flexure 160 in the axial, or lateral, direction (e.g., z-direction) relative to the higher stiffness aspects provided by mount 104 in the vertical direction (e.g., the y-direction) and/or the thrust direction (e.g., x-direction). This comparatively lower stiffness in the axial direction allows lateral movement of carrier 140 and the supported device (e.g., the engine) relative to housing 120 with low force transmittal to the support structure (e.g., the frame), thereby reducing the amount of vibratory force and displacement imparted to the airframe. This arrangement is very effective in reducing the vibration transmission of the primary tonal excitation frequencies of the engine (e.g., N1 and N2, including within the range of 80-500 Hz.), but also in reducing broadband disturbances. In some embodiments, the elastomeric material is molded by injecting the elastomeric material in liquid form in and around flexure 160 after the assembly thereof. In other embodiments, the elastomeric material can be formed as layers that are incorporated between one or more layers of flexure 160 to provide internal damping aspects to flexure 160. In some such embodiments, the elastomeric material is formed as layers that are incorporated between each layer of flexure 160 to provide internal damping aspects to flexure 160. This provides a wear-resistant shear-connection between each of the flexing layers for relative motion due to bending. In still other embodiments, the elastomeric material can be manually layered during the assembly process. In yet another embodiment, flexure 160 is encapsulated by a pourable potting compound, adhesive, or epoxy, after assembly of the device. As noted above, the elastomeric material also provides an environmental barrier for wire flexure 160C, preventing particulate and liquid infiltration, which can lead to corrosion and premature degradation of performance of wire flexure 160C, thereby reducing the useful service life of mount 104. In some embodiments, the individual flexing layers 162 of flexure 160 may be coated in the elastomeric material during assembly of mount 104. In some embodiments, the elastomeric material is formed and/or molded such that an outer surface of the elastomeric material is substantially the same height as the outer circumferential surfaces of housing portions 122A and 122B, such that mount 104 has a substantially smooth and/or continuous outer annular surface.

FIGS. 9A and 9B are schematic views of two further embodiments configured to accommodate cocking deflections which can lead to excess stress and deflection of a portion of flexure 160. According to the embodiment of FIG. 9A, mount 100 is installed in a conventional rigid monoball structure 190, which is itself attached to an engine or aircraft frame. According to the embodiment of FIG. 9B, rigid monoball structure 190 is incorporated within carrier 140. In both embodiments, rigid monoball structure 190 is configured to allow for rotational articulation and pivoting in the cocking deflection directions, thereby helping to prevent uneven stresses being transmitted into flexure 160. Any of mounts 100, 102, 104, 106, and 108 can be installed within rigid monoball structure 190. Similarly, any of mounts 100, 102, 104, 106, and 108 can have rigid monoball structure 190 incorporated within carrier 140, 220.

Another example embodiment of a compliant engine mount, generally designated 106, is shown in FIGS. 10A-10G. Mount 106 is in a form of a center trunnion mount configured to support and attach, for example, an aircraft engine to an aircraft frame. As can be seen in FIGS. 10A-10G, mount 106 according to this example embodiment has a housing, generally designated 200, a carrier 220, and a flexure, generally designated 240. Housing 200 has an outer profile that is substantially circular, thus enabling mount 106 to be installed within a conventional cylindrical socket of either a frame (e.g., an airframe) or an engine. Housing 200 comprises a first housing portion 202A, a second housing portion 202B, and a third housing portion 202C. Second and third housing portions 202B and 202C each have outer housing flanges 208, which have a generally circular sectional profile, such that mount 106 has a circular side profile when second and third housing portions 202B and 202C are assembled together to define housing seam 204. First, second, and third housing portions 202A, 202B, and 202C may have any suitable profile, such that mount 106 can be configured to be mounted within any suitable opening in, for example, an engine or supporting structure. Housing seam 204 is defined by the interface between first, second, and third housing portions 202A, 202B, and 202C and is circumferentially interrupted by flexure passages 212.

Carrier 220 is attached to first housing portion 202A by flexure 240, when mount 106 is in an assembled state, and is located within housing 200. In this embodiment, the orientation of flexure 240 allows for more even loading of each strand or layer of flexure 240 when carrier 220 is rotated or "cocked" relative to housing 200. The orientation of flexure 240 also allows for carrier 220 to pivot about either the contact point defined by the reverse thrust snubbing surfaces 214 and 234 or axis 262. Carrier 220 comprises notches 226 formed therein, in which rotary spindles 260 are inserted. Carrier 220 also comprises bore holes, in which pins 264 are inserted to pass through a hole formed through a thickness of each of the rotary spindles 260. Pins 264 pass through the full thickness of the notch in which pin 264 is inserted and pins 264 are secured at both ends by carrier 220. In this embodiment, flexure 240 is one or more wires that are wrapped a plurality of times around carrier 220 and first housing portion 202A.

In some embodiments, flexure 240 may be formed from a single wire wrapped a plurality of times around carrier 220 and first housing portion 202A. In some embodiments, carrier 220 and first housing portion 202A may be pre-tensioned in contact with each other at reverse thrust snubbing surfaces 214 and 234 by applying a compressive force as the wire forming flexure 240 is wrapped around carrier 220 and first housing portion 202A. The number of times that the wire forming flexure 240 is wrapped while forming flexure 240 is determined by the forces being reacted by mount 106, the mechanical properties of the wire forming flexure 240, the internal geometry of mount 106, including the distance between the inner surface of flexure passage 212 and rotary spindle 260, and the like. When carrier 220 is pre-tensioned to be in contact with first housing portion 202A, carrier 220 and first housing portion 202A will remain in contact with each other at reverse thrust snubbing surfaces 214 and 234 until a force is reacted by mount 106 that is of a greater magnitude than the pre-tensioning force holding carrier 220 and first housing portion 202A together. In some other embodiments, flexure 240 can comprise a plurality of stacked flexing layers separated from each other by spacers, as shown at least in FIG. 3. In such embodiments where flexure 240 comprises flexing layers, it may be advantageous for assembly of flexure 240 for notches 226 of carrier 220 to be sufficiently deep that rotary spindles 260 can be inserted far enough to be entirely recessed therein while the flexing layers are installed, with the rotary spindle 260 being configured to then be moved to be co-aligned with axis 262.

First housing portion 202A has at least one flexure passage, generally designated 212, formed therein. In the embodiment shown, first housing portion 202A has a plurality of flexure passages 212 formed therein. First housing portion 202A has a reduced cross-sectional area where flexure passages 212 are formed. The flexure passages 212 of first housing portion 202A are, in some embodiments, centered substantially vertically with a corresponding notch 226 of carrier 220 in which flexure 240 is held captive when in the assembled state. In other embodiments, one or more of the flexure passages 212 may be misaligned vertically from a corresponding notch 226 of carrier 220. Each flexure passage 212 is shown having a same vertical height as a height of the vertical distance between the upper and lower retaining flanges of rotary spindle 260, such that flexure 240 has a substantially constant cross-sectional profile along the stadium shape formed by flexure 240. In other embodiments, one or more of flexure passages 212 have a different height than the vertical distance between the upper and lower retaining flanges of rotary spindle 260, such that flexure 240 has a variable cross-sectional profile along the stadium shape formed by flexure 240. Carrier 220 is rotatable about axis 262 to allow for "cocking" deflections of carrier 220 relative to housing 200. In some embodiments a friction-reducing coating may be provided between pins 264 and rotary spindle 260 and/or carrier 220 to allow carrier to more freely rotate about axis 262.

When in a laterally un-deflected position, the outer lateral surfaces of carrier 220 may be co-planar to, recessed within, and/or extend beyond the outer lateral surface of second and third housing portions 202B and 202C, respectively. In some embodiments, there is no retention feature included in housing 200 to limit an amount of relative movement between carrier 220 and housing 200 and, correspondingly, an amount of lateral deflection of flexure 240. In other embodiments, as shown, for example, in the embodiment of FIGS. 7A-7C, second and/or third housing portion 202B and/or 202C may extend beyond, and partially enclose, the outer lateral surfaces of carrier 220 within housing 200, such that an amount of lateral movement of carrier 220 within housing 200 is bounded by a gap between the outer lateral surfaces of carrier 220 and the corresponding inner lateral surfaces of second and third housing portions 202B and 202C. In some embodiments, an amount of lateral movement of carrier 220 relative to second housing portion 202B or third housing portion 202C may not be limited by housing 200 in one direction, but may be limited in another direction.

Mount 106 can be installed with either of second and third housing portions 202B and 202C in an outboard position. For purposes of discussion, second housing portion 202B of housing 200 will be referred to herein as defining the "rear" of mount 106 for ease of explanation. As such, second housing portion 202B of housing 200 is located at the rear of mount 106, while third housing portion 202C is at the front of mount 106. Next, each flexure 240 is shown being arranged around and in contact with carrier 220 and first housing portion 202A, holding the carrier 220 and the first housing portion 202A together as a single unit. Second and third housing portions 202B and 202C of housing 200 are then secured around the unit formed by the carrier 220 and first housing portion 202A, such that, after assembly, flexure 240 is separated from and not in direct contact with either of second and third housing portions 202B and 202C when no external force, for example, a forward thrust force, is transmitted to carrier 220.

Still referring to FIGS. 10A-10G, the structure of flexure 240 is shown. Flexure 260 is composed of concentrically wound wires to form a shape of a geometric "stadium". In the embodiment shown, the wire forming the flexure 240 is made of a metal, but other suitable materials, including elastomeric materials, may be substituted depending on the forces being reacted. Flexure 240 of this embodiment is illustrated without elastomeric material, such as is shown and described relative to the embodiment of FIGS. 1-5B to better illustrate the internal components of mount 106, but any suitable elastomeric material may be used, depending on the level of vibration attenuation needed in any given application.

Figure 10A:
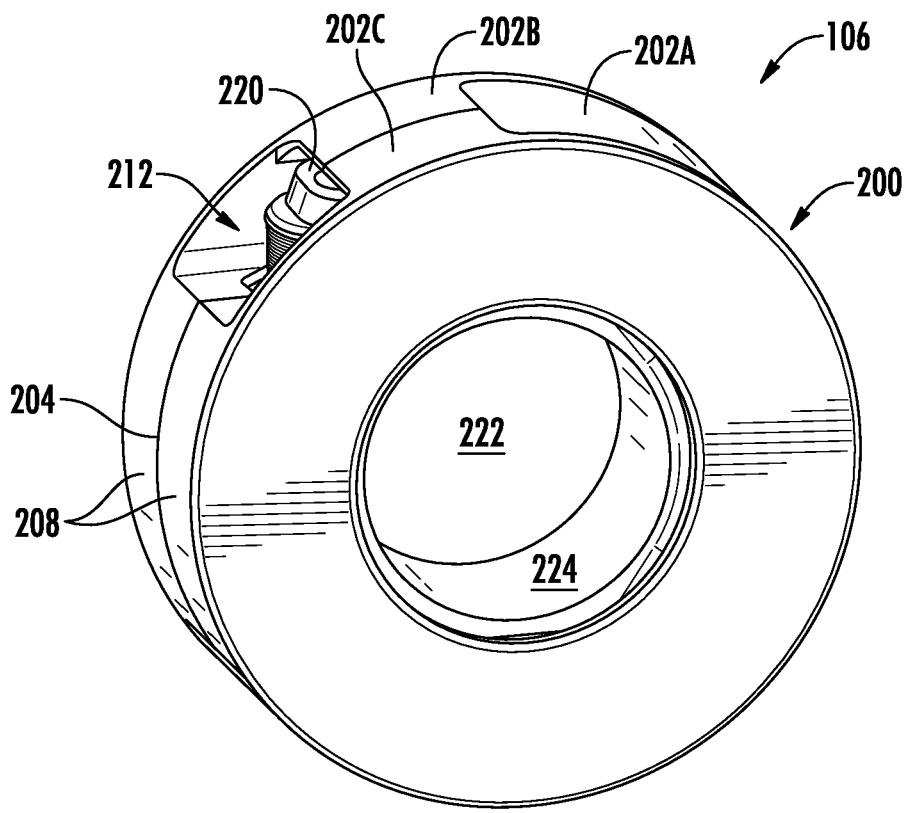
FIG. 10A shows an example embodiment of a compliant engine mount.
Figure 10B:
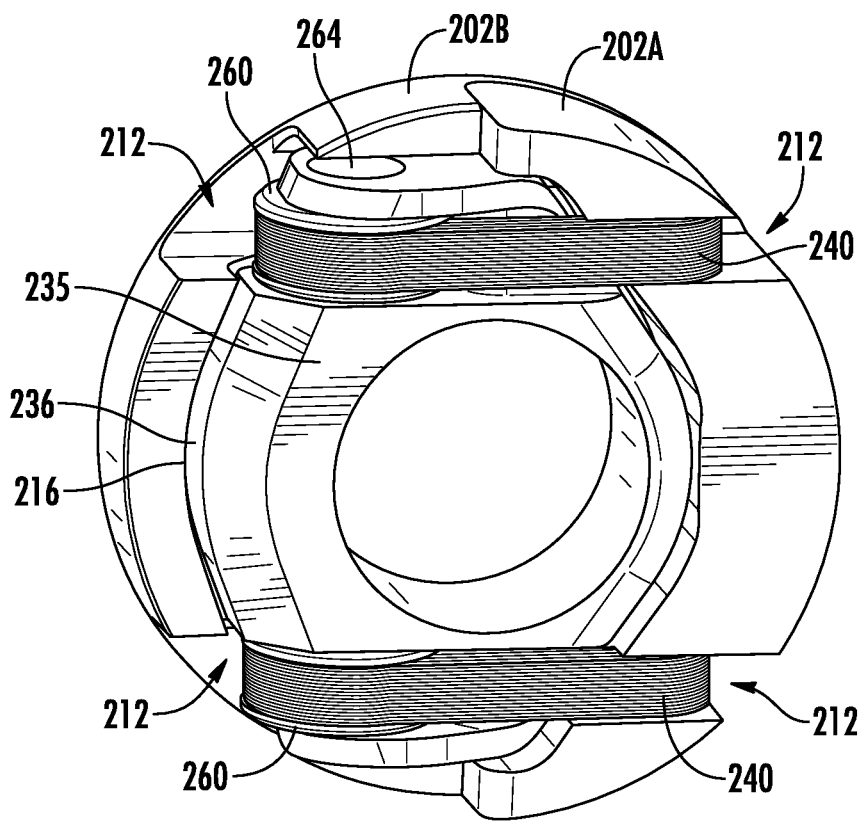
FIGS. 10B and 10C are internal views of the compliant engine mount of FIG. 10A.
Figure 10C:
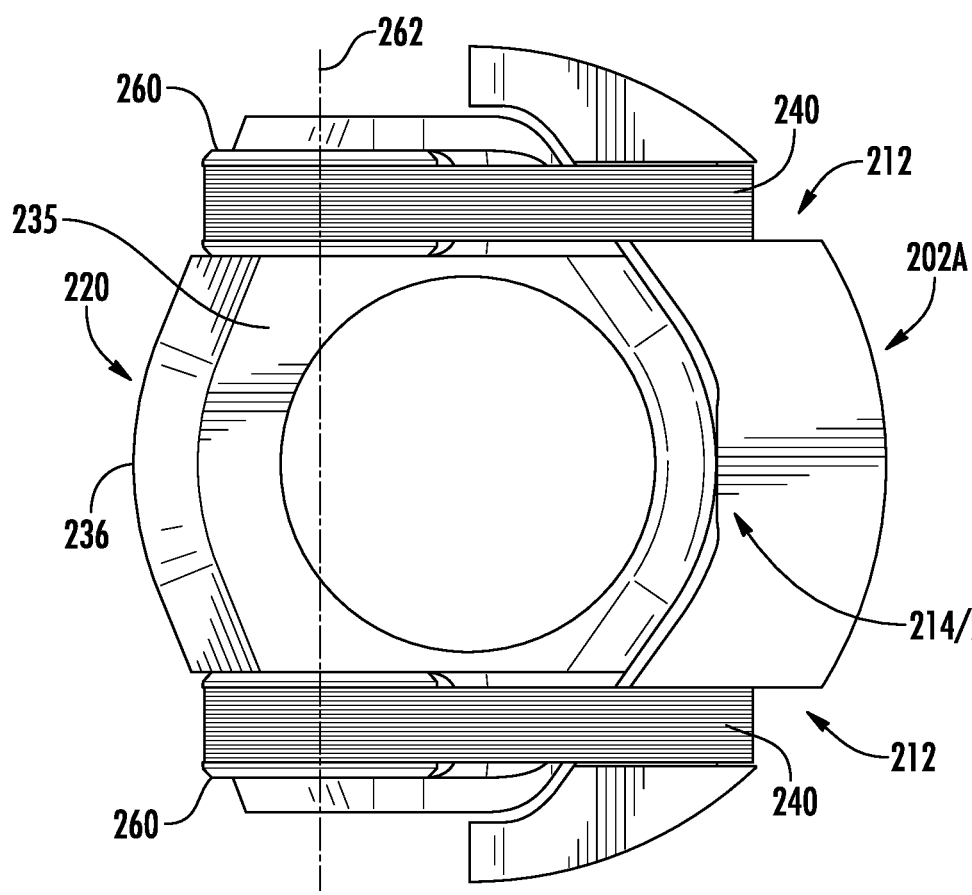
Figure 10D:
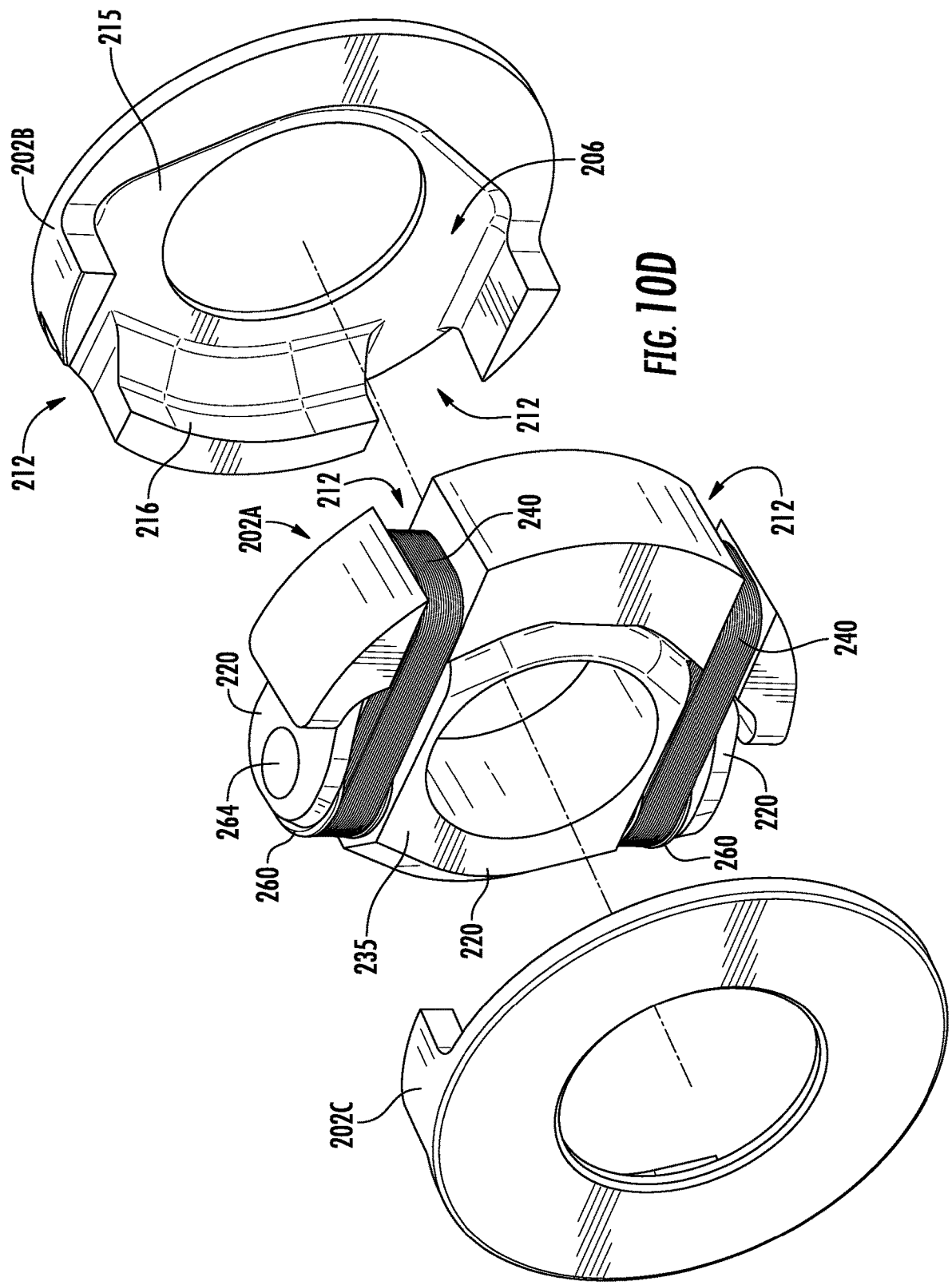
FIGS. 10D and 10E are exploded views of the compliant engine mount of FIG. 10A.
Figure 10E:
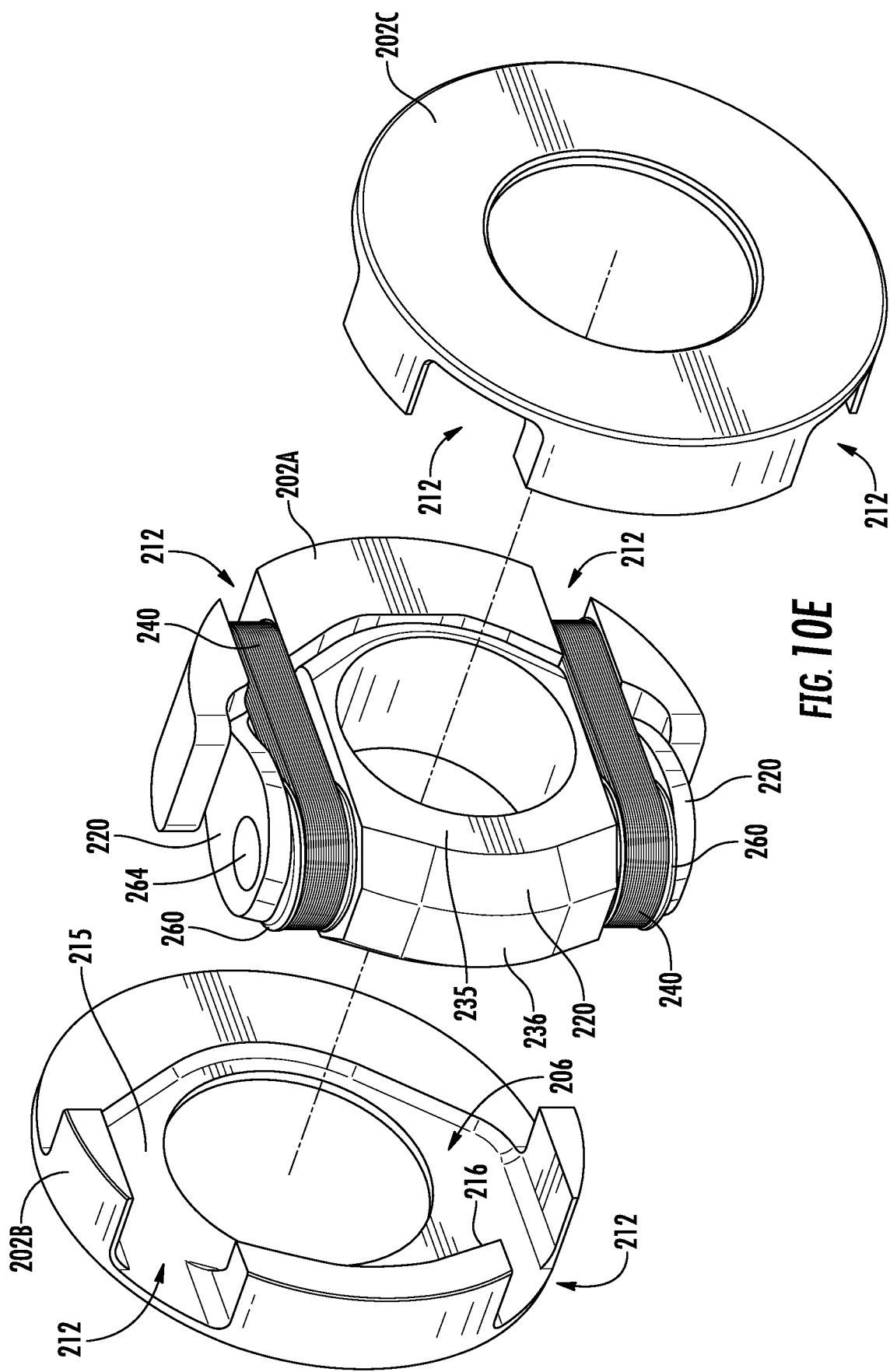

Housing 200 is shown more detail in FIGS. 10D and 10E, which are exploded assembly views of mount 106. As shown, housing 200 has first, second, and third housing portions 202A, 202B, and 202C. Second and third housing portions 202B and 202C are shown as being substantially symmetric as mirror images of each other and, as such, mount 106 is configured to be installed to support engines on either side of an aircraft. In some embodiments, housing 200 is designed such that second and third housing portions 202B and 202C are asymmetrical, such that mount 106 can only be used in only one orientation (e.g., only one side of an aircraft). Since housing 200 is symmetric in this embodiment, the structures of second and third housing portions 202B and 202C are mirrored about a plane defined by housing seam 204, shown in FIG. 10A. In this embodiment, first housing portion 202A has a recessed housing-flexure support surface (HFSS) at a portion thereof within flexure passages 212 where flexure 240 contacts first housing portion 202A. Because of the flexure passages 212 formed in first housing portion 202A, flexure 240 does not extend radially beyond the outer profile of housing 200. One or more of second and third housing portions 202B and 202C have at least one flexure passage 212 formed therein. In the embodiment shown, second and third housing portions 202B and 202C have a plurality of flexure passages 212 formed at a position around the outer portion of second and third housing portions 202B and 202C adjacent to rotary spindles 260. In some embodiments, flexure passages 212 may be used to visually inspect flexure 240.

Figure 10G:
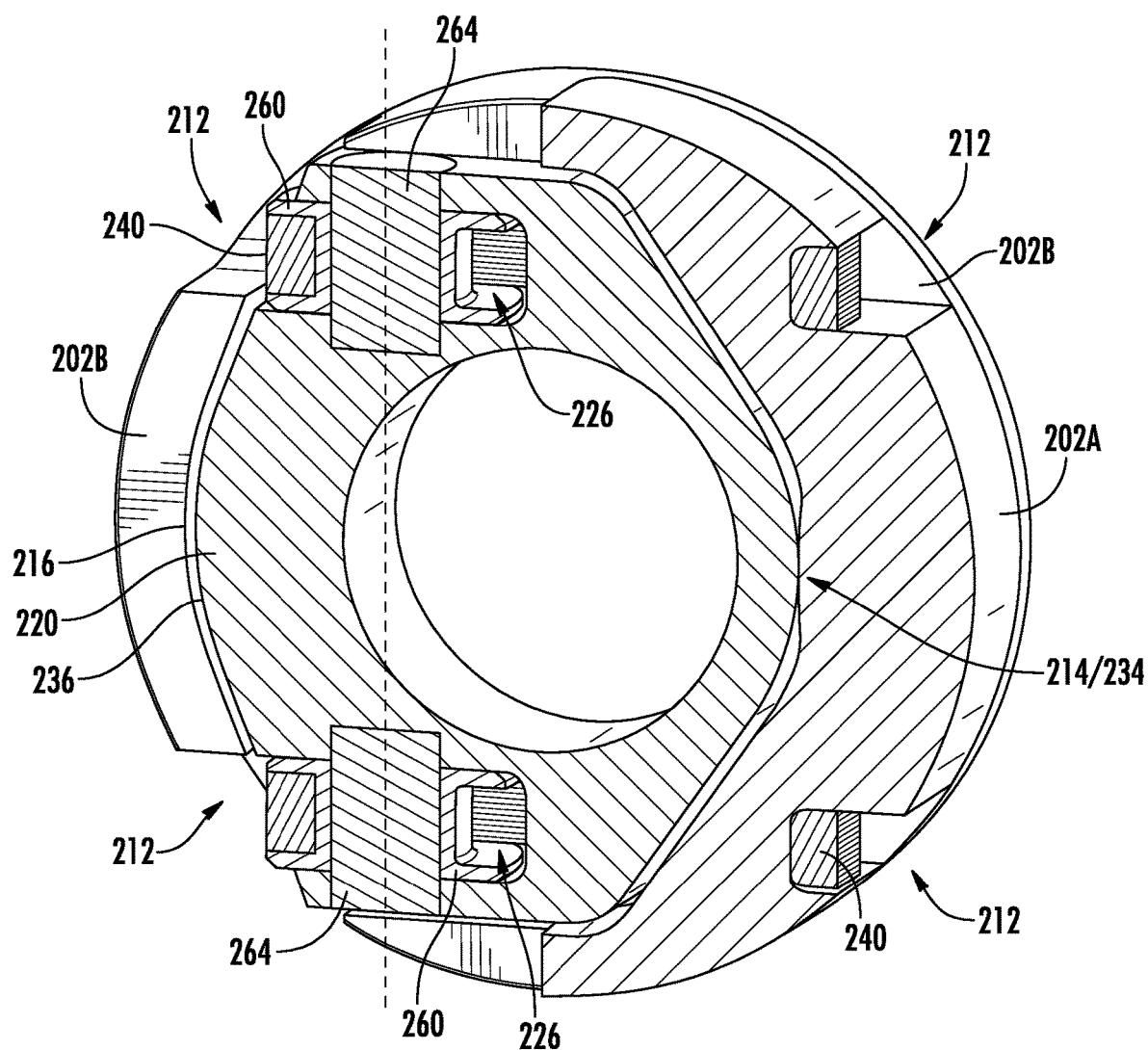
FIG. 10G is a cross-sectional view of the compliant engine mount of FIG. 10A, taken along the cut-line 10G-10G shown in the top view of the compliant engine mount shown in FIG. 10F.

Still referring to FIGS. 10D and 10E, embodiments of forward thrust snubbing surface 216, which is formed in each of second and third housing portions 202B and 202C, and forward thrust snubbing surface 236, which is formed in carrier 220, are illustrated. Reverse thrust snubbing surfaces 214 and 234 are illustrated in FIGS. 10C and 10G. Reverse thrust snubbing surfaces 214 and 234 are provided to prevent excess relative displacement of carrier 220 relative to first housing portion 202A in the reverse thrust direction. Forward thrust snubbing surfaces 216 and 236 are provided to prevent excess relative displacement of carrier 220 relative to first housing portion 202A in the forward thrust direction. Reverse thrust snubbing surface 214 and forward thrust snubbing surface 216 can be formed at any suitable position on first, second, and third housing portions 202A, 202B, and 202C to limit deflection or displacement of carrier 220 relative to housing 200 in any radial direction. When carrier 220 is in contact, via reverse thrust or forward thrust snubbing surfaces 234 and 236, with either of reverse thrust or forward thrust snubbing surfaces 214 and 216, respectively, this contact between carrier 220 and housing 200 provides a mechanical force-transmission "short circuit" between carrier 220 and housing 200, such that forces and vibrations from the trunnion pin (not shown) into carrier 220 can pass directly into housing 200 without having to pass through flexure 240. Snubbing surfaces 134 and 136 are provided to prevent damage to mount 106 from excess deflection of flexure 240 when the forces transmitted to carrier 220 are in excess of those forces anticipated and designed for during normal operation of the aircraft, such as may be experienced during a cruise phase of flight and/or during a typical take-off and/or landing. Second and third housing portions 202B and 202C are provided with lateral snubbing surfaces 235 and carrier 220 is provided with lateral snubbing surfaces 215. Lateral snubbing surfaces 215 and 235 are configured to prevent excessive lateral movements of carrier 220 relative to housing 200. When carrier 220 is in contact, via either of lateral snubbing surfaces 235, with either of the lateral snubbing surfaces 215, this contact between carrier 220 and housing 200 provides a mechanical force-transmission "short circuit" between carrier 220 and housing 200, such that forces and vibrations from the trunnion pin (not shown) into carrier 220 can pass directly into housing 200 without having to pass through flexure 240. In some embodiments, other snubbing surfaces may be included that are configured to, for example, limit displacement of carrier 140 relative to housing 120 in the vertical direction (e.g., the y-direction).

In the embodiment shown in FIGS. 10A-10G, carrier 220 is formed as a single piece that is configured to be attached, via flexure 240, to first housing portion 202A of housing 200. The orientation of carrier 140 within housing 120 is positively defined by the shape of first housing portion 202A and second and third housing portions 202B and 202C. Carrier 220 has a cylindrical inner race 224, defined by a hole 222 through a thickness of carrier 220, measured along the axis of extension of hole 222. Inner race 224 may have a non-cylindrical shaped profile in some embodiments. In other embodiments, inner races 224 are not a full thickness of carrier 220. Hole 222 is configured to receive and interface with a trunnion pin (not shown) at inner race 224. The trunnion pin (not shown) is connected to a supported device or a supporting structure, for example, an aircraft engine or an aircraft frame, respectively.

Mount 106 is configured to provide a higher stiffness in a radial direction, for example a thrust direction of an aircraft on the ground and/or during a cruise phase of flight, than a stiffness provided in an axial direction, such as a direction aligned with a trunnion pin (not shown) inserted into mount 106 to support, for example, an aircraft engine. In some embodiments, the stiffness provided by mount 106 in the radial direction, for example a thrust direction as defined hereinabove, can be at least an order of magnitude, i.e., greater by a factor of at least ten, than a stiffness provided by mount 106 in the axial direction, which is aligned with the longitudinal axis of the trunnion pin (not shown). In some embodiments, the stiffness provided by mount 106 in the radial direction, for example a thrust direction as defined hereinabove, can be at least two orders of magnitude greater, i.e., greater by a factor of at least 100, than the stiffness provided by mount 106 in the axial direction, which is aligned with the longitudinal axis of the trunnion pin (not shown). In some embodiments, the stiffness provided by mount 106 in the radial direction, for example a thrust direction as defined hereinabove, can be at least three orders of magnitude greater, i.e., greater by a factor of at least 1,000, than the stiffness provided by mount 106 in the axial direction, which is aligned with the longitudinal axis of the trunnion pin (not shown). Regardless of the degree to which a stiffness provided by mount 106 in the radial direction, for example the thrust direction as defined hereinabove, is greater than a stiffness in the axial direction, as described hereinabove, mount 106 provides, in some such embodiments, substantially a same stiffness, e.g., within 25%, within 10%, within 5%, within 2%, or within 1%, in the vertical and axial directions. In such embodiments where the stiffness provided by mount 106 in the vertical and axial directions is substantially the same, as defined hereinabove, the degree or ratio between the stiffness provided by mount 106 in the thrust direction and the stiffness provided by mount 106 in the vertical and/or axial direction is substantially a same value, depending on the degree of variance between the stiffness provided by mount 106 in the vertical and axial directions, respectively.

This comparatively higher stiffness in one or more radial direction allows mount 106 to react the forces transmitted from the trunnion pin (not shown) into carrier 220, while still allowing for the comparatively lower stiffness aspects of mount 106 in the axial direction of the trunnion pin (not shown). Carrier 220 has reverse thrust snubbing surface 234 oriented in the reverse thrust direction, forward thrust snubbing surface 236 oriented in the forward thrust direction, and lateral snubbing surfaces 235 oriented in the lateral, or axial, direction. These reverse thrust, lateral, and forward thrust carrier snubbing surfaces 234, 235, and 236 correspond to and interact with the respective housing reverse thrust, lateral, and forward thrust snubbing surfaces 214, 215 and 216, each of which have been described hereinabove with respect to at least FIGS. 10D and 10E. As noted above, when reverse thrust is transmitted from the engine to mount 106 via carrier 220, carrier 220 and housing 200 directly contact each other at their respective reverse thrust snubbing surfaces 214 and 234. Similarly, when a forward thrust force that exceeds the design parameters of mount 106 is transmitted to mount 106 via carrier 220, carrier 220 contacts housing 200 at the respective forward thrust snubbing surfaces 216 and 236, thus preventing excessive and potentially damaging deformation of flexure 240 by excessive displacement of carrier 220 relative to housing 200. When a lateral deflection force that exceeds the design parameters of mount 106 is transmitted to mount 106 via carrier 220, carrier 220 contacts housing 200 at one of the lateral snubbing surfaces 215, thus preventing excessive and potentially damaging lateral deflection and/or deformation of flexure 240 by excessive lateral displacement of carrier 220 relative to housing 200.

In some embodiments, mount 106 can comprise a first housing portion 202A and a second housing portion 202B, which comprises the features of second and third housing portions 202B and 202C in FIGS. 10A-10G, substantially in a manner wherein second and third housing portions 202B and 202C are integrally formed as a single piece and/or monolithically. In some embodiments, flexure 240 is at least partially coated with an elastomeric material, as described hereinabove and incorporated entirely herein, relative to the embodiments shown in FIGS. 1-7C. Such elastomeric materials are provided to reduce the transmission of vibrations between carrier 220 and housing 200. In some embodiments, the elastomeric material provides an environmental seal around the internal components of flexure 240, as well as to damp high frequency "ringing" modes of the individual flexing layers and/or wires of flexure 240. Vibration isolation and/or damping is provided primarily through the comparatively low stiffness aspect of flexure 240 in the axial, or lateral, direction defined by an axis of hole 222, which allows lateral movement of carrier 220 and the supported device, e.g., the engine, relative to housing 200 with low force transmittal to the support structure, e.g., the frame, thereby reducing the amount of vibratory force and displacement imparted to the support structure. This arrangement reduces the vibration transmission of the primary tonal excitation frequencies of the engine (e.g., N1 and N2), but also in reducing broadband disturbances. In some embodiments, the elastomeric material is injected in liquid form in and around flexure 240 after the assembly thereof with carrier 220 and at least portions of housing 200. In other embodiments where the flexure comprises a plurality of stacked flexing layers, the elastomeric material is formed as layers that are incorporated between each layer of flexure 240 to provide internal damping aspects to flexure 240. This provides a wear-resistant shear-connection between each of the flexing layers for relative motion due to bending. In other such embodiments, the elastomeric material can be manually layered during the assembly process. In yet another embodiment, flexure 240 is encapsulated by a pourable potting compound, adhesive, or epoxy, after assembly of the device. The elastomeric material also provides an environmental barrier for flexure 240, preventing particulate and liquid infiltration, which can lead to corrosion and premature degradation of performance of flexure 240, thereby reducing the useful service life of mount 106. In some embodiments, the individual flexing layers of flexure 240 may be coated in the elastomeric material during assembly of mount 106. In some embodiments, the elastomeric material is formed and/or molded such that an outer surface of the elastomeric material is substantially the same height as the outer circumferential surfaces of second and third housing portions 202B and 202C, such that mount 106 has a substantially smooth and/or continuous outer annular surface. Elastomeric material may be incorporated in any of the embodiments disclosed herein without limitation, at least in any manner described hereinabove.

The semicircular end portions flexure 240 have a substantially similar profile to each other and are in substantially circumferential contact with rotary spindle 260 or first housing portion 202A at flexure passages 212, respectively, such that some or all of the straight portions (e.g., upper and lower portions) of flexure are not in direct contact with either carrier 220 or housing 200, but instead "float" between the curved semicircular ends of the stadium-shaped flexure 240. The semicircular ends of flexure 240 are fixed between the upper and lower flanges of rotary spindle 260, which is fixed in position relative to carrier 220 by pin 264, or the upper and bottom surfaces of the cut-out portion of first housing portion 202A, defined by the dimensions of flexure passage 212 formed in first housing portion 202A, respectively, thereby preventing any movement of the part of flexure 240 held between rotary spindle 260 and first housing portion 202A. As such, an axial force will cause the flexure 240 to rotate about flexure passage 212 at which flexure 240 is secured to first housing portion 202A and/or about rotary spindle 260, pin 264, and axis 262. When a force in the forward thrust direction is transmitted to carrier 220, the straight portions of the wire forming the flexure 240 reacts this forward thrust force in tension. Once the forward thrust force is of a sufficient magnitude to overcome any pre-tension applied to hold carrier 220 in contact with housing 200 at reverse thrust snubbing surfaces 214 and 234, the straight portions of flexure 240 become strained and are elongated in tension, such that carrier 220 is not in direct contact with housing 200, or any portions thereof. This elongation of flexure 240 and "floating" of carrier 220 relative to housing 200 allows carrier 220 to more easily move laterally relative to housing 200 with lower stiffness, as described elsewhere hereinabove, compared to conventionally known center trunnion-style mounts. This relative lateral movement between carrier 220 and housing 200 is achieved by a bending of the wires forming flexure 240 in the axial, or lateral, direction and/or rotation of the flexure 240 as carrier 220 moves relative to housing 200 in the axial direction.

The size of the wire, number of windings, dimensions, and/or shape of flexure 240 can be selected depending on the application. The use of a lower number of windings, smaller wire, and the like will reduce stiffness in all directions. The number of windings required can vary widely from one application to the next, depending on the strength requirements and the flexibility needed for mount 106. Ideally, to provide a minimum axial stiffness, a larger quantity of thinner wires comprising flexure 240 is preferred compared to a lesser quantity of thicker wires comprising flexure 240. The number of windings used in flexure 240 can be selected from a wide range, from as few as approximately 10 to as many as 50, 100, 200, 500, 1000, or more, so long as relative axial movement between flexure 240 and housing 200 and flexure 240 and carrier 220 are prevented.

Figure 11:
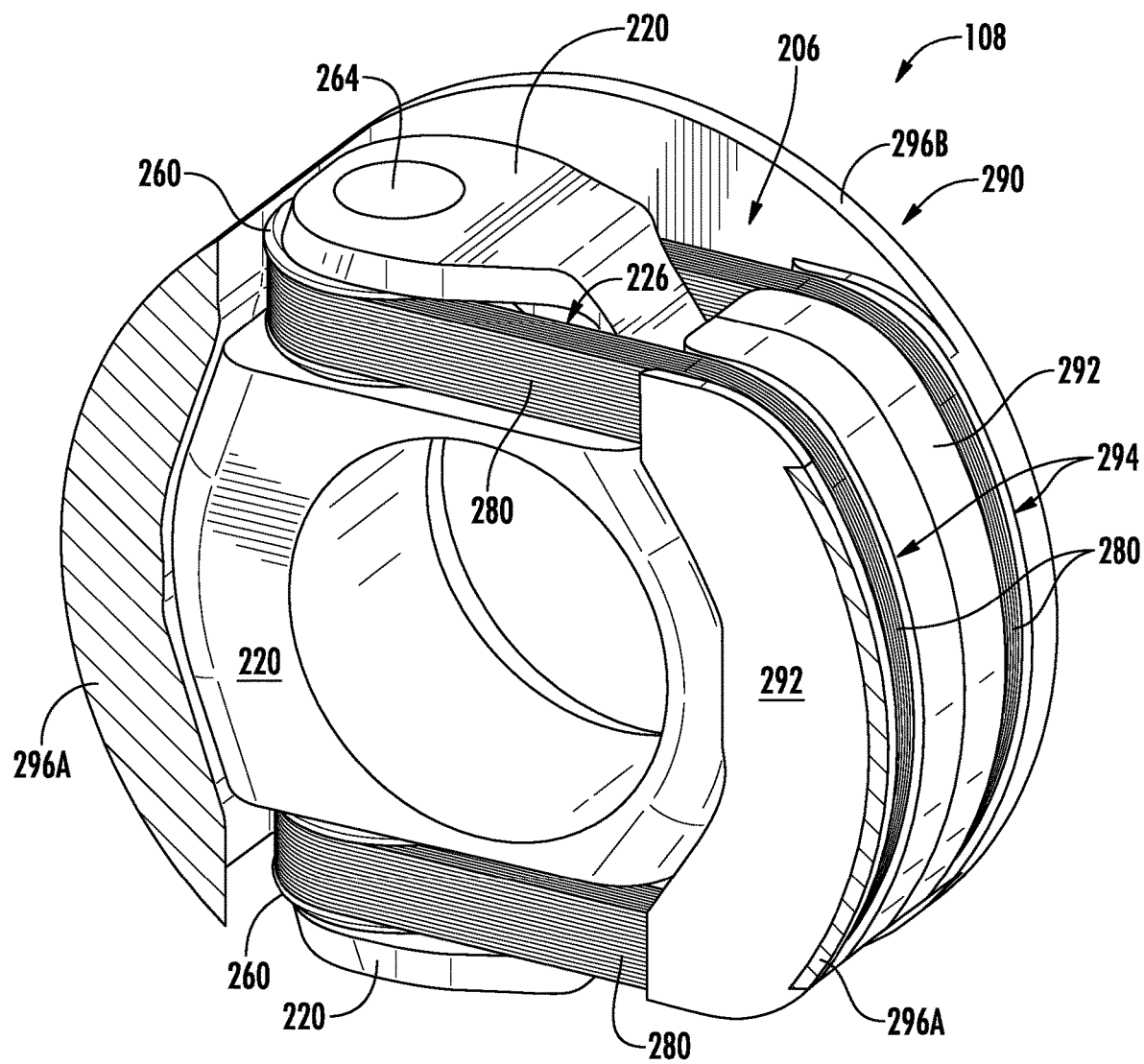
FIG. 11 shows an example embodiment of a compliant engine mount.

Another example embodiment of a compliant engine mount, generally designated 108, is shown in FIG. 11. This embodiment has many of the features, structures, and functionality described hereinabove regarding the example embodiment of FIGS. 10A-10G. Mount 108 is in a form of a center trunnion mount configured to support and attach, for example, an aircraft engine to an aircraft frame. As can be seen in FIG. 11, mount 108 according to this example embodiment has a housing, generally designated 290, a carrier 220, and a flexure 280. Housing 290 has an outer profile that is substantially circular, thus enabling mount 108 to be installed within a conventional cylindrical socket of either a frame (e.g., an airframe) or an engine. Housing 290 comprises first, second, and third housing portions 292, 296A, and 296B. Carrier 220 is attached to first housing portion 292 by flexure 280, when mount 108 is in an assembled state, and is located within housing 200. In this embodiment, first housing portion 292 has a plurality of circumferentially-oriented channels, generally designated 294, formed in outer surfaces thereof, in which flexure 280 is arranged. In this embodiment, channels 294 have a depth and width that corresponds at least to a cross-sectional height and width of the flexure 280. In this embodiment, the orientation of flexure 280 allows for more even loading of each strand or layer of flexure 280 when carrier 220 is rotated or "cocked" relative to housing 290. The orientation of flexure 280 also allows for carrier 220 to pivot about the axis defined by a longitudinal axis that is co-axial with pins 264. Carrier 220 comprises notches 226 formed therein, in which rotary spindles 260 are inserted. Carrier 220 also comprises bore holes, in which pins 264 are inserted to pass through a hole formed through a thickness of each of the rotary spindles 260. Pins 264 pass through the full thickness of the notch 226 in which pin 264 is inserted and pins 264 are secured at both ends by carrier 220. In this embodiment, flexure 280 is one or more wires that are wrapped a plurality of times around carrier 220 and first housing portion 292. In some embodiments, flexure 280 may be formed from a single wire wrapped a plurality of times around carrier 220 and first housing portion 292. In some embodiments, carrier 220 and first housing portion 292 may be pre-tensioned in contact with each other at reverse thrust snubbing surfaces 214 and 234, similar to those shown in FIGS. 10A-10G, by applying a compressive force as the wire forming flexure 280 is wrapped around carrier 220 and first housing portion 292. The number of times that the wire forming flexure 280 is wrapped while forming flexure 280 is determined by the forces being reacted by mount 108, the mechanical properties of the wire forming flexure 280, the internal geometry of mount 108, and the like. When carrier 220 is pre-tensioned to be in contact with first housing portion 292, carrier 220 and first housing portion 292 will remain in contact with each other at the snubbing surfaces until a force is reacted by mount 108 that is of a greater magnitude than the pre-tensioning force holding carrier 220 and first housing portion 292 together.

As shown in FIG. 11, first housing portion 292 has a slot formed circumferentially around both lateral sides of the outer perimeter, in which second and third housing portions 296A and 296B engage against first housing portion 292 to secure second and third housing portions 296A and 296B to first housing portion 292. In some embodiments, second housing portion 296A may be formed integrally with third housing portion 296B, such that the features of both second and third housing portions 296A and 296B are integrally and/or monolithically formed in a single second housing portion 296A. In some embodiments, flexure 280 is at least partially coated with an elastomeric material, as described hereinabove and incorporated entirely herein, relative to the embodiments shown in FIGS. 1-7C. Such elastomeric materials are provided to reduce the transmission of vibrations between carrier 220 and housing 290. In some embodiments, the elastomeric material provides an environmental seal around the internal components of flexure 280, as well as to damp high frequency "ringing" modes of the individual flexing layers and/or wires of flexure 280. Vibration isolation and/or damping is provided primarily through the low stiffness aspect of flexure 280 in the axial, or lateral, direction defined by an axis of a hole formed through carrier 220, which allows lateral movement of carrier 220 and the supported device, e.g., the engine, relative to housing 290 with low force transmittal to the support structure, e.g., the frame, thereby reducing the amount of vibratory force and displacement imparted to the support structure. This arrangement reduces the vibration transmission of the primary tonal excitation frequencies of the engine (e.g., N1 and N2), but also in reducing broadband disturbances. In some embodiments, the elastomeric material is injected in liquid form in and around flexure 280 after the assembly thereof with carrier 220 and at least portions of housing 290. In other embodiments where the flexure comprises a plurality of stacked flexing layers, the elastomeric material is formed as layers that are incorporated between each layer of flexure 280 to provide internal damping aspects to flexure 280. This provides a wear-resistant shear-connection between each of the flexing layers for relative motion due to bending. In other such embodiments, the elastomeric material can be manually layered during the assembly process. In yet another embodiment, flexure 280 is encapsulated by a pourable potting compound, adhesive, or epoxy, after assembly of the device. The elastomeric material also provides an environmental barrier for flexure 280, preventing particulate and liquid infiltration, which can lead to corrosion and premature degradation of performance of flexure 280, thereby reducing the useful service life of mount 106. In some embodiments, the individual flexing layers of flexure 280 may be coated in the elastomeric material during assembly of mount 108. In some embodiments, the elastomeric material is formed and/or molded such that an outer surface of the elastomeric material is substantially the same height as the outer circumferential surfaces of housing portions 296A and 296B, such that mount 108 has a substantially smooth and/or continuous outer annular surface. Elastomeric material may be incorporated in any of the embodiments disclosed herein without limitation, at least in any manner described hereinabove.

The semicircular end portions flexure 280 have a substantially similar profile to each other and are in substantially circumferential contact with rotary spindle 260, such that some or all of the straight portions (e.g., upper and lower portions) of flexure are not in direct contact with either carrier 220 or housing 290, but instead "float" between the curved semicircular ends of the stadium-shaped flexure 280. The semicircular ends of flexure 280 are fixed between the upper and lower flanges of rotary spindle 260, which is fixed in position relative to carrier 220 by pin 264, or the upper and bottom surfaces of the cut-out portion of first housing portion 292, defined by the dimensions of flexure passage 294 formed in first housing portion 292, respectively, thereby preventing any movement of the part of flexure 280 held between rotary spindle 260 and first housing portion 292. As such, an axial force will cause the flexure 280 to rotate about rotary spindle 260, pin 264, and axis 262. When a force in the forward thrust direction is transmitted to carrier 220, the straight portions of the wire forming flexure 280 reacts this forward thrust force in tension. Once the forward thrust force is of a sufficient magnitude to overcome any pre-tension applied to hold carrier 220 in contact with housing 290 at the snubbing surfaces, the straight portions of flexure 280 become strained and are elongated in tension, such that carrier 220 is not in direct contact with housing 290, or any portions thereof. This elongation of flexure 280 and "floating" of carrier 220 relative to housing 290 allows carrier 220 to more easily move laterally relative to housing 290 with very low stiffness compared to conventionally known center trunnion-style mounts. This relative lateral movement between carrier 220 and housing 290 is achieved by a bending of the wires forming flexure 280 in the axial, or lateral, direction and/or rotation of the flexure 280 as carrier 220 moves relative to housing 290 in the axial direction.

The size of the wire, number of windings, dimensions, and/or shape of flexure 280 can be selected depending on the application. The use of a lower number of windings, smaller wire, and the like will reduce stiffness in all directions. The number of windings required can vary widely from one application to the next, depending on the strength requirements and the flexibility needed for mount 108. Ideally, to provide a minimum axial stiffness, a larger quantity of thinner wires comprising flexure 280 is preferred compared to a lesser quantity of thicker wire comprising flexure 280. The number of windings used in flexure 280 can be selected from a wide range, from as few as approximately 10 to as many as 50, 100, 200, 500, 1000, or more, so long as relative axial movement between flexure 280 and housing 290 and flexure 280 and carrier 220 are prevented.

Mount 108 is configured to provide a higher stiffness in a radial direction, for example a thrust direction of an aircraft on the ground and/or during a cruise phase of flight, than a stiffness provided in an axial direction, such as a direction aligned with a trunnion pin (not shown) inserted into mount 108 to support, for example, an aircraft engine. In some embodiments, the stiffness provided by mount 108 in the radial direction, for example a thrust direction as defined hereinabove, can be at least an order of magnitude, i.e., greater by a factor of at least ten, than a stiffness provided by mount 108 in the axial direction, which is aligned with the longitudinal axis of the trunnion pin (not shown). In some embodiments, the stiffness provided by mount 108 in the radial direction, for example a thrust direction as defined hereinabove, can be at least two orders of magnitude greater, i.e., greater by a factor of at least 100, than the stiffness provided by mount 108 in the axial direction, which is aligned with the longitudinal axis of the trunnion pin (not shown). In some embodiments, the stiffness provided by mount 108 in the radial direction, for example a thrust direction as defined hereinabove, can be at least three orders of magnitude greater, i.e., greater by a factor of at least 1,000, than the stiffness provided by mount 108 in the axial direction, which is aligned with the longitudinal axis of the trunnion pin (not shown). Regardless of the degree to which a stiffness provided by mount 108 in the radial direction, for example the thrust direction as defined hereinabove, is greater than a stiffness in the axial direction, as described hereinabove, mount 108 provides, in such embodiments where flexure 280 comprises multiple windings or one or more wires or filaments, substantially a same stiffness, e.g., within 25%, within 10%, within 5%, within 2%, or within 1%, in the vertical and axial directions. In such embodiments where the stiffness provided by mount 108 in the vertical and axial directions is substantially the same, as defined hereinabove, the degree or ratio between the stiffness provided by mount 108 in the thrust direction and the stiffness provided by mount 108 in the vertical and/or axial direction is substantially a same value, depending on the degree of variance between the stiffness provided by mount 108 in the vertical and axial directions, respectively.

Figure 12:
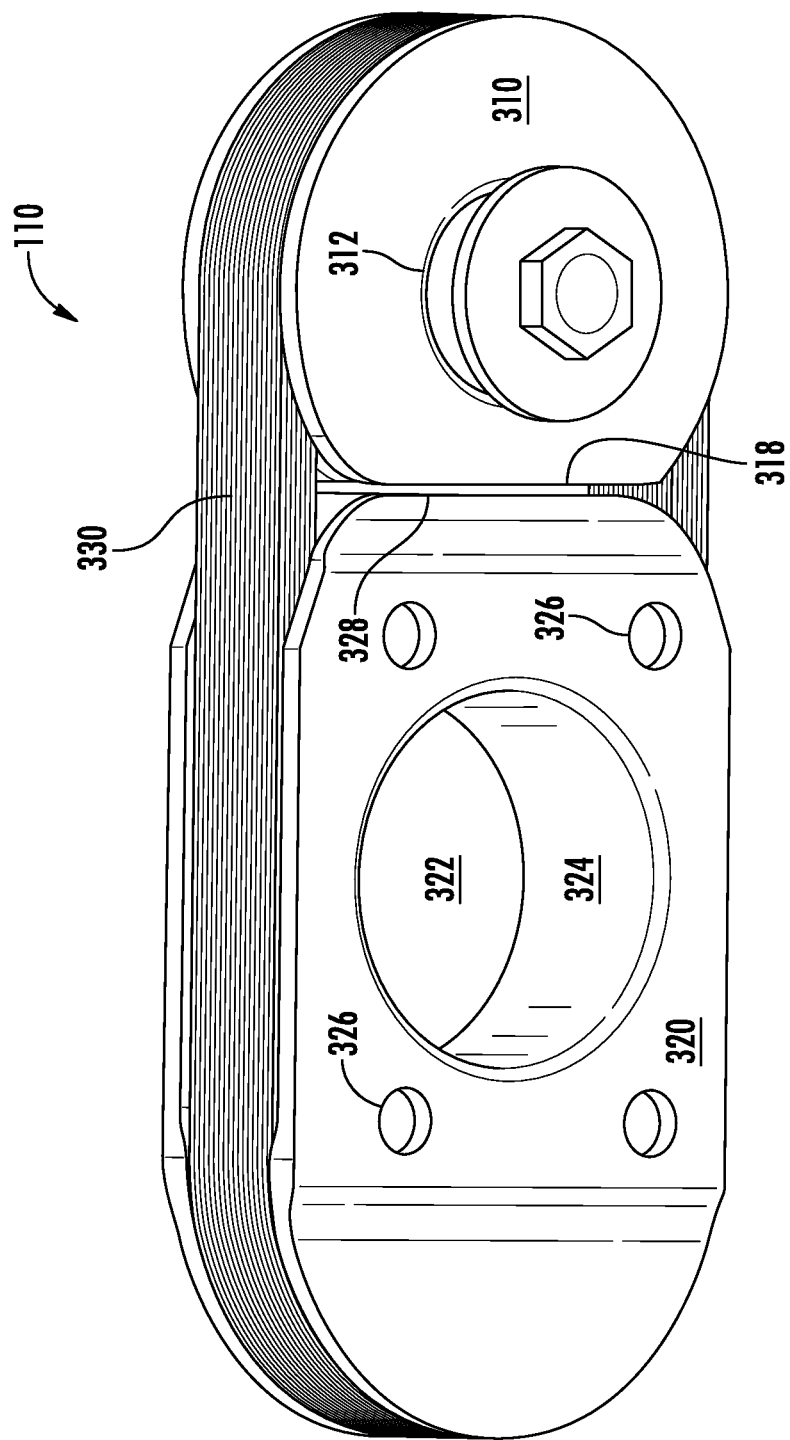
FIG. 12 shows an example embodiment of a compliant engine mount.
Figure 13B:
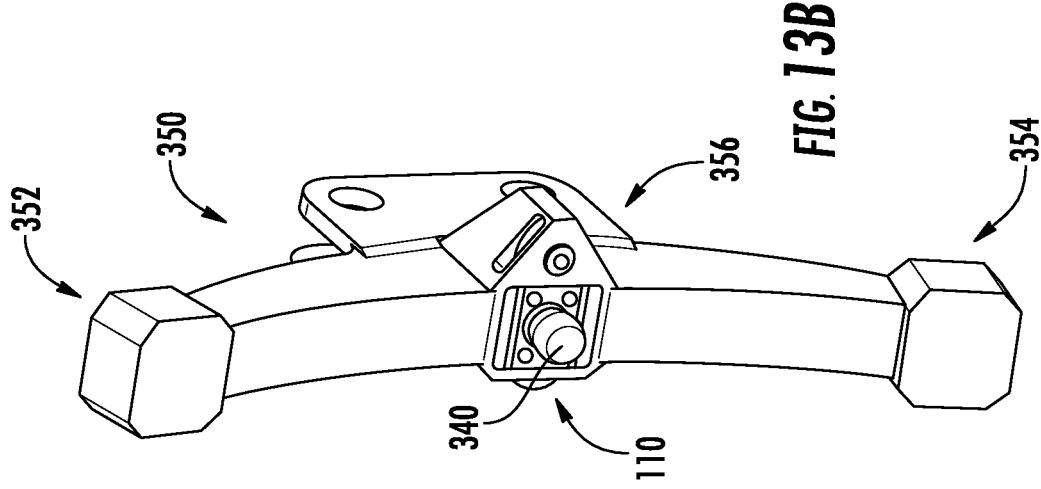
FIGS. 13A, 13B, and 13C show an example embodiment of an engine mount system comprising a compliant engine mount shown in FIG. 12.
Figure 13A:
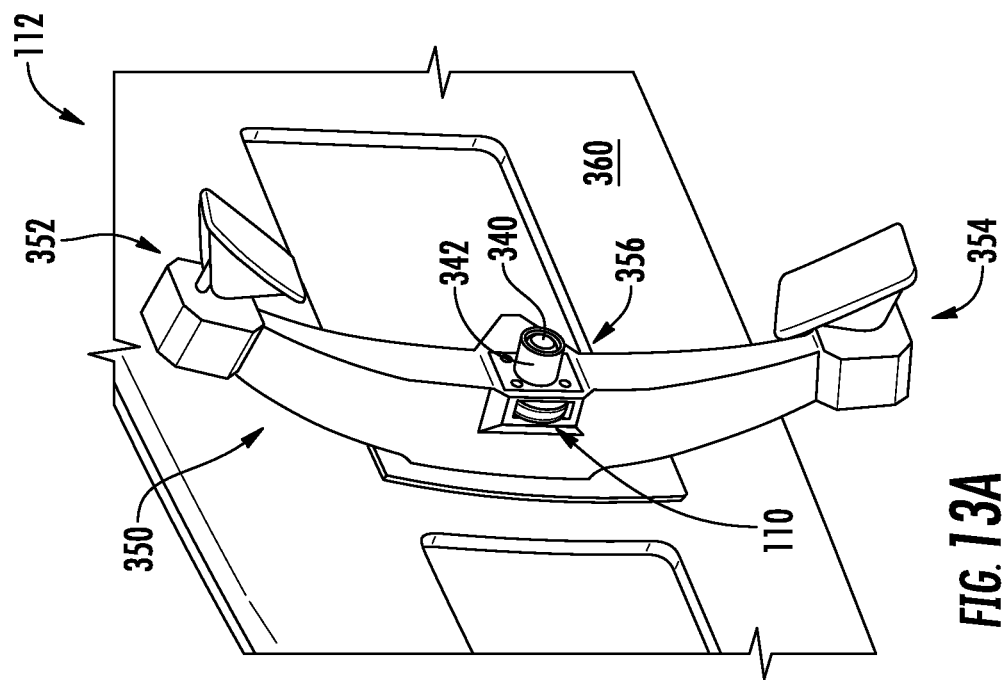
Figure 13C:
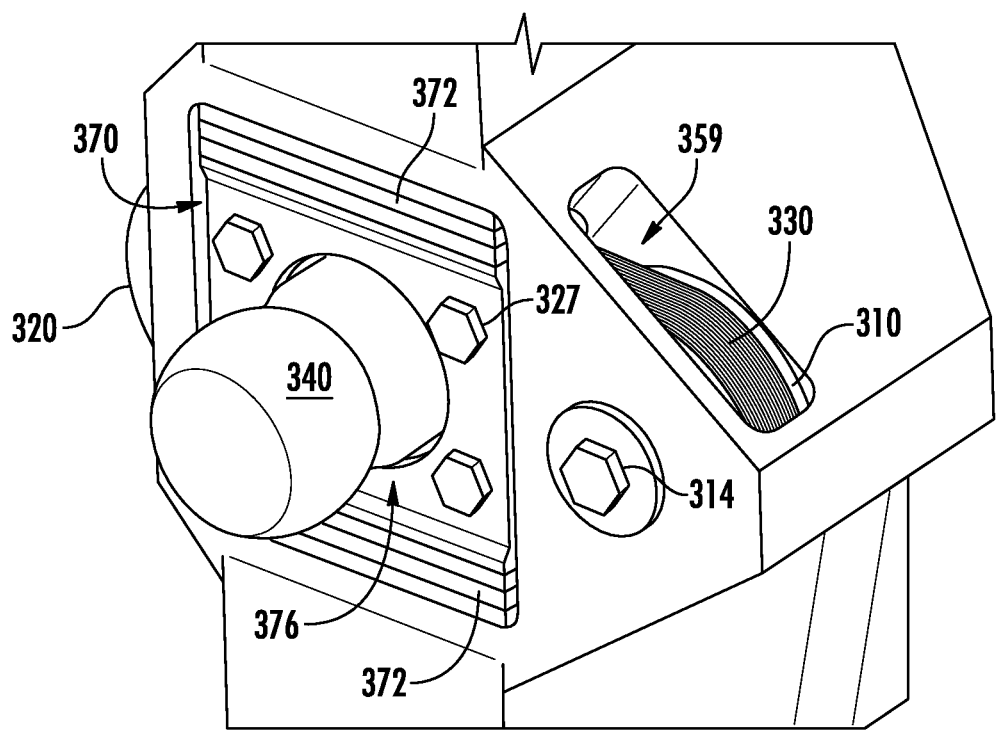
Figure 13D:
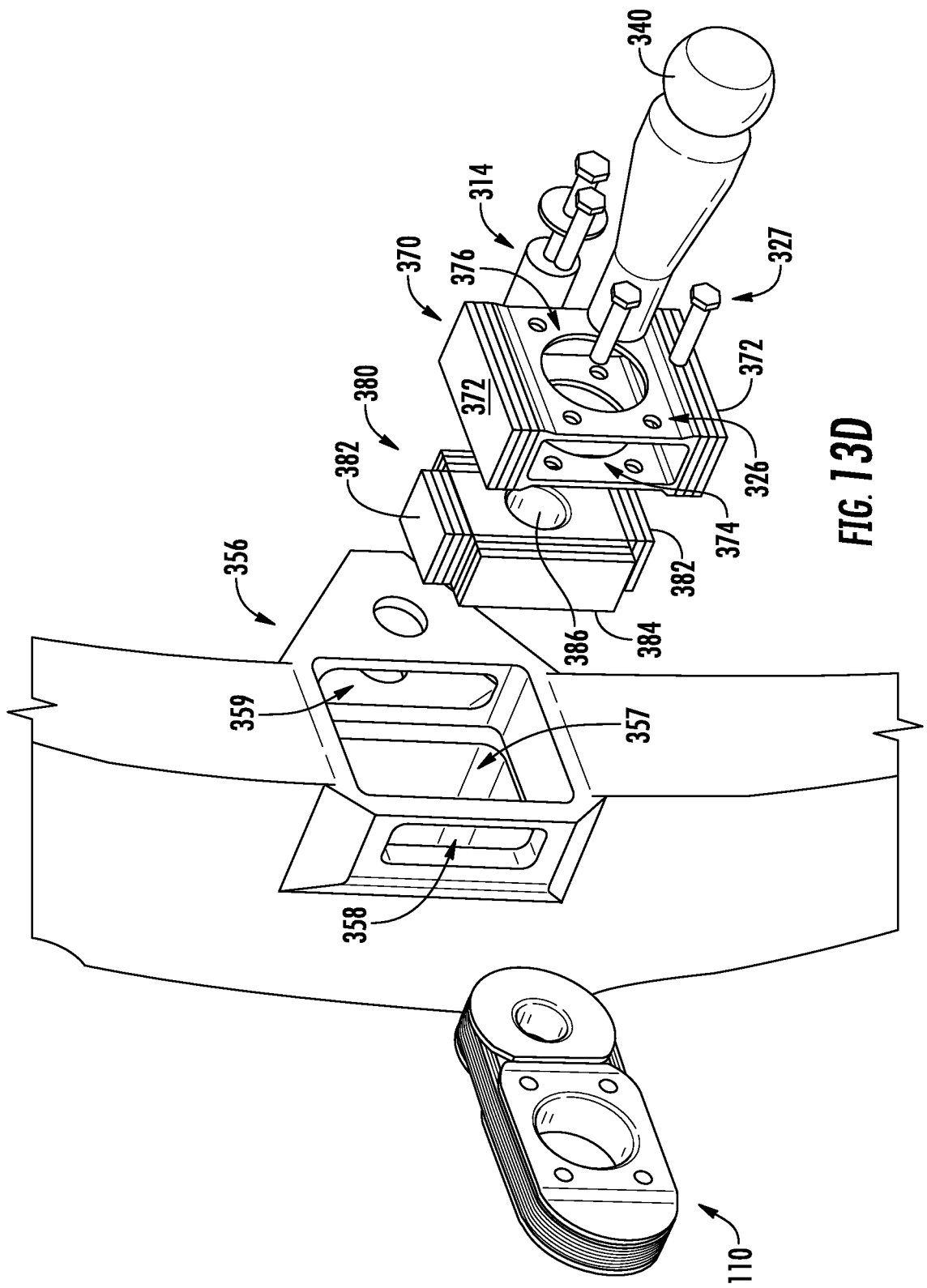
Figure 13F:
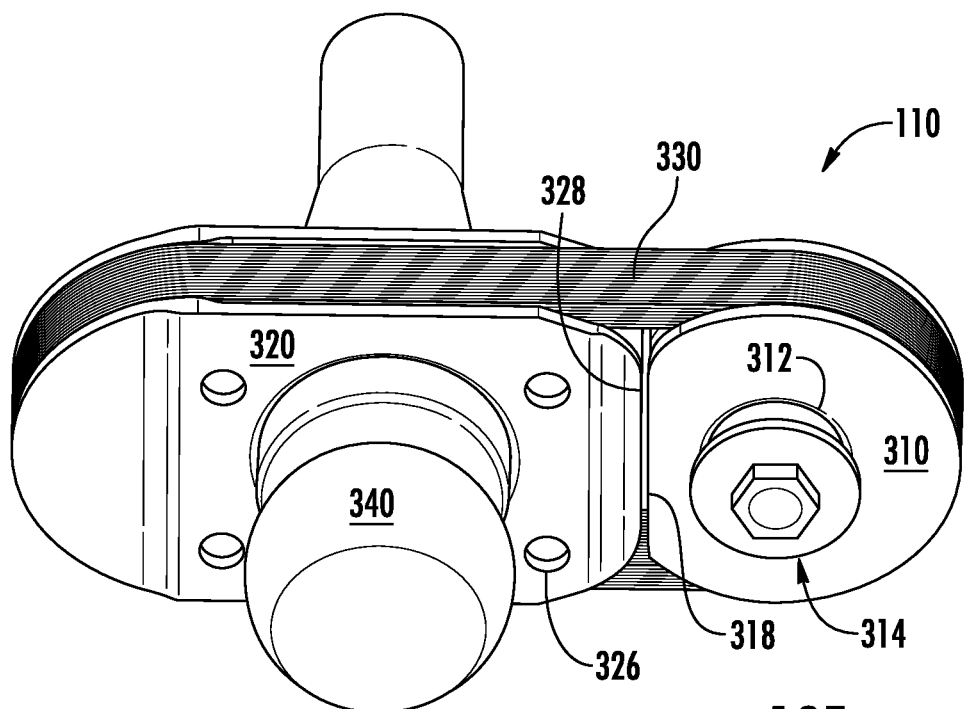
FIGS. 13F, 13G, and 13H are partial assembly views of the engine mount system shown in FIGS. 13A, 13B, and 13C.
Figure 13G:
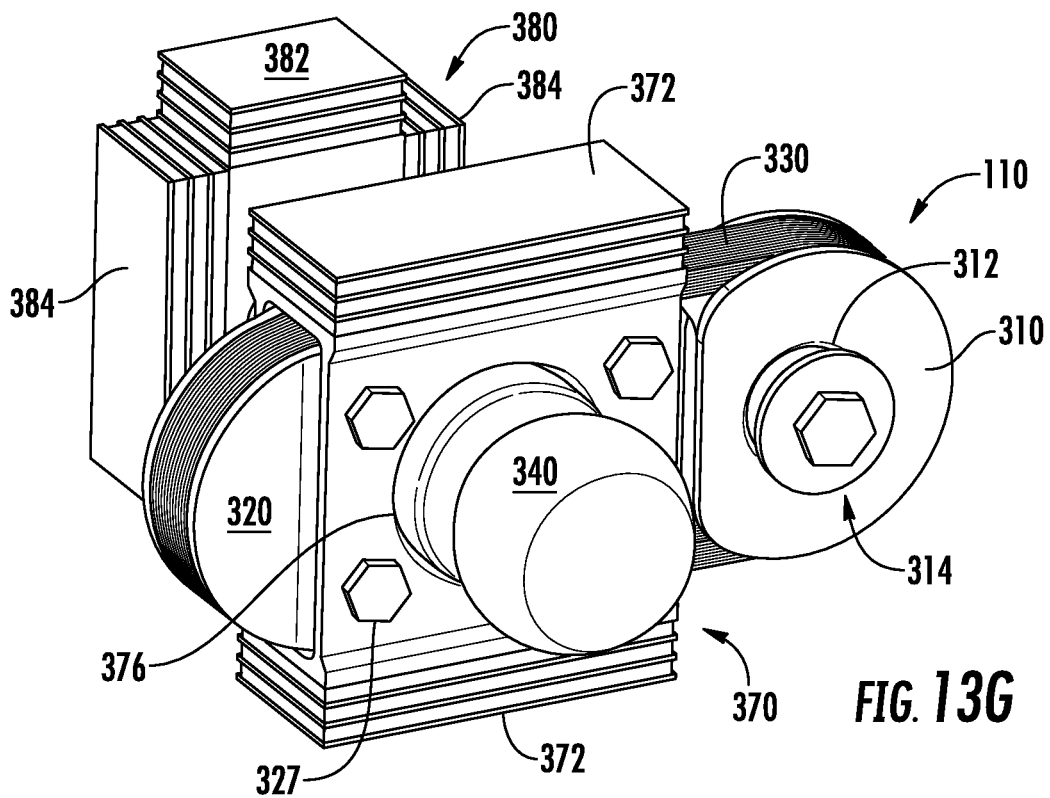
Figure 13H:
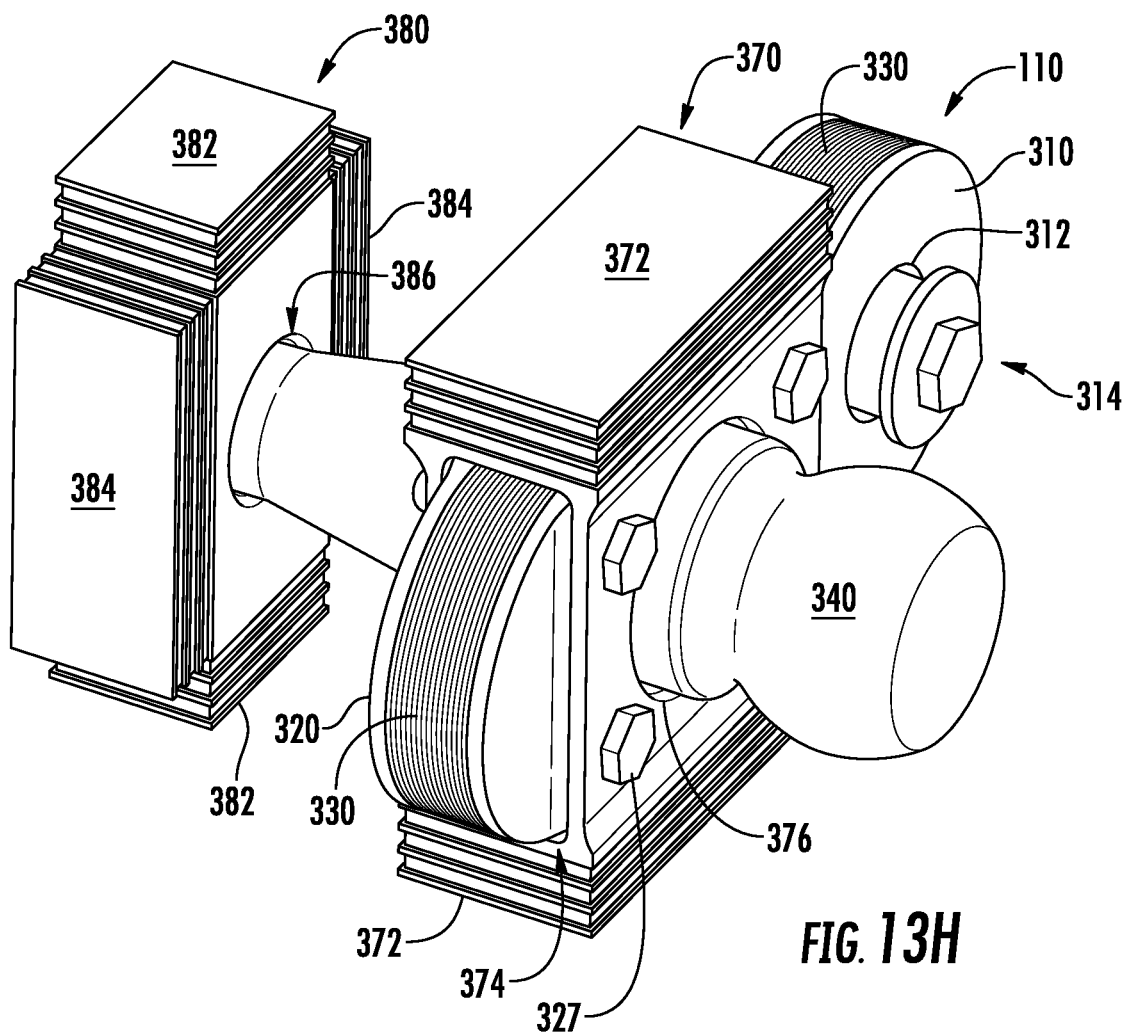

Another example embodiment of a compliant engine mount, generally designated 110, is shown in FIG. 12. Mount 110 is in a form of a center trunnion mount configured to support and attach, for example, an aircraft engine to an aircraft frame. In this embodiment, mount 110 has a first housing 310, a second housing 320, and a flexure 330. The first housing 310 is connected to the second housing 320 by a flexure 330 that comprises at least one wire wrapped concentrically around the first and second housings 310 and 320. Mount 110 has an outer profile that is in the shape of a "stadium," with semicircular ends and substantially flat lateral edges connecting the semicircular ends. Both first and second housings 310 and 320 have at least one flat edge, respectively, where they are configured to be in contact with each other. These flat edges of first and second housings 310 and 320 are compressive snubbing surfaces 318 and 328. One or both of first and second housings 310 and 320 can be solid or internally hollow. In this embodiment, flexure 330 comprises one or more wires that are wrapped a plurality of times around first and second housings 310 and 320. In some embodiments, flexure 330 may be formed from a single wire wrapped a plurality of times around first and second housings 310 and 320. In some embodiments, first and second housings 310 and 320 may be pre-tensioned in contact with each other at snubbing surfaces 318 and 328 by applying a compressive force as the wire forming flexure 330 is wrapped around carrier first and second housings 310 and 320. The number of times that the wire forming flexure 330 is wrapped while forming flexure 330 is determined by the forces being reacted by mount 110, the mechanical properties of the wire forming flexure 330, the internal geometry of mount 110, and the like. When first and second housings 310 and 320 are pre-tensioned to be in contact with each other, the first and second housings 310 and 320 will remain in contact with each other at snubbing surfaces 318 and 328 until a force is reacted by mount 110 that is of a greater magnitude than the pre-tensioning force holding first and second housings 310 and 320 together. In some other embodiments, flexure 330 comprises a plurality of stacked flexing layers separated from each other by spacers, as shown at least in FIG. 3.

First and second housings 310 and 320 have channels formed about at least portions of their perimeters to accommodate and retain flexure 330 within such channels. In some embodiments, the channels are formed around at least three sides of the first and second housings 310 and 320. In some such embodiments, the channels are formed about the entire perimeter of the first and second housings 310 and 320, except at the snubbing surfaces 318 and 328. The size of the channels formed in one or both of first and second housings 310 and 320 is, in some embodiments, at least a same size as a cross-sectional area of flexure 330, such that flexure 330 does not extend beyond an outer perimeter of mount 110.

When in a laterally un-deflected position, first and second housings 310 and 320 are centered about each other and/or the outer lateral surfaces thereof are co-planar with each other. In some embodiments, retention features may be included in one or both of first and second housings 310 and 320 to limit an amount of relative movement between first and second housings 310 and 320 and, correspondingly, an amount of lateral deflection of flexure 330 in a bending region defined as the portion of flexure 330 that is not contained within the respective channels formed about the perimeter of first and second housings 310 and 320.

Mount 110 can be installed with either of first and second housings 310 and 320 being secured, by one of holes 312 or 322, to the supporting structure, such as a yoke of an aircraft engine support system or device. Flexure 330 is composed of concentrically wound wires that form a shape of a geometric "stadium." In the embodiment shown, the wire forming the flexure 330 is made of a metal, but other suitable materials, including elastomeric materials, may be substituted depending on the forces being reacted by mount 110. Flexure 330 of this embodiment is illustrated without elastomeric material being shown, such as is shown and described relative to the embodiment of FIGS. 1-5B to better illustrate the internal components of mount 106, but any suitable elastomeric material may be used, depending on the level of vibration attenuation needed in any given application. Second housing 320 has a plurality of through-holes 326 that are used to secure mount to an intermediate floating structures, shown and described in the system of FIGS. 13A-13H.

Mount 110 is configured to provide a higher stiffness in a radial direction, for example a thrust direction of an aircraft on the ground and/or during a cruise phase of flight, than a stiffness provided in an axial direction, such as a direction aligned with a trunnion pin (not shown) inserted into mount 110 to support, for example, an aircraft engine. In some embodiments, the stiffness provided by mount 110 in the radial direction, for example a thrust direction as defined hereinabove, can be at least an order of magnitude, i.e., greater by a factor of at least ten, than a stiffness provided by mount 110 in the axial direction, which is aligned with the longitudinal axis of the trunnion pin (not shown). In some embodiments, the stiffness provided by mount 110 in the radial direction, for example a thrust direction as defined hereinabove, can be at least two orders of magnitude greater, i.e., greater by a factor of at least 100, than the stiffness provided by mount 110 in the axial direction, which is aligned with the longitudinal axis of the trunnion pin (not shown). In some embodiments, the stiffness provided by mount 110 in the radial direction, for example a thrust direction as defined hereinabove, can be at least three orders of magnitude greater, i.e., greater by a factor of at least 1,000, than the stiffness provided by mount 110 in the axial direction, which is aligned with the longitudinal axis of the trunnion pin (not shown). Regardless of the degree to which a stiffness provided by mount 110 in the radial direction, for example the thrust direction as defined hereinabove, is greater than a stiffness in the axial direction, as described hereinabove, mount 110 provides, in such embodiments where flexure 330 comprises multiple windings or one or more wires or filaments, substantially a same stiffness, e.g., within 25%, within 10%, within 5%, within 2%, or within 1%, in the vertical and axial directions. In such embodiments where the stiffness provided by mount 110 in the vertical and axial directions is substantially the same, as defined hereinabove, the degree or ratio between the stiffness provided by mount 110 in the thrust direction and the stiffness provided by mount 110 in the vertical and/or axial direction is substantially a same value, depending on the degree of variance between the stiffness provided by mount 110 in the vertical and axial directions, respectively.

Referring to FIGS. 13A-13F and 13H, a system, generally designated 112, for providing compliant force and/or vibration isolation, e.g., damping, in an aircraft is shown. System 112 comprises a yoke, generally designated 350, which is fixedly connected to fuselage 360. In some embodiments, yoke 350 is made to be integral with fuselage 360. Yoke 350 comprises an upper mount, generally designated 352, a lower mount, generally designated 354, and a center mount, generally designated 356. Upper and lower mounts 352 and 354 are illustrated schematically herein and are of any suitable type, including, for example, conventional compliant mounts. Center mount 356 comprises at least one mount 110, as described hereinabove relative to FIG. 12, and at least one trunnion pin, which in this illustration is at least one trunnion pin 340, which has a monoball construction in some embodiments, including the example embodiment shown herein. A race 342 is shown over the monoball portion of trunnion pin 340 in FIG. 13A, such that race 342 can fit within and engage against a cylindrical receiving opening in an engine. In some other embodiments, the center mount 356 may be provided on the supported structure, such as the aircraft engine, with the receiving opening described above being formed in yoke 350 in place of the center mount 356 shown and described herein.

As shown in FIGS. 13C-13H, mount 110 is inserted within first isolator, generally designated 370 and is then secured to yoke by a fastener, generally designated 314, that passes through hole 312 formed through a thickness of first housing 310, such that first housing 310 is rigidly attached to yoke 350. In some embodiments, the rigid attachment of first housing 310 is also rotatable about fastener 314. Fastener 314 can include, for example, a cylindrical sleeve, at least one washer, an externally threaded member, such as a bolt or screw, and an internally threaded member, such as a nut. In some embodiments the internally threaded member can be integrally formed with, and/or attached to, yoke 350. Trunnion pin 340, when inserted through mount 110 at center mount 356, is supported at least at two positions. At the first position, the mount is supported primarily in the vertical direction by first isolator 370. As the second position, the mount is supported in both the vertical and fore-aft directions by second isolator 380.

Yoke 350 has an inner pocket 357 formed through a thickness, aligned with the direction of extension of trunnion pin 340, of yoke 350. Inner pocket 357 has a depth at least large as a combined depth of the first and second isolators 370 and 380. Yoke 350 has a channel 358 formed in a fore surface of yoke, such that channel 358 is connected to inner pocket 357. Yoke 350 also has a pocket 359 that extends from an aft surface of the yoke, such that pocket 359, inner pocket 357, and channel 358 comprise a single continuous opening. Mount 110 is inserted into pocket 374 of first isolator 370, which has a cross-sectional area at least as large as the outer perimeter of mount 110 and extends through the entire depth of first isolator 370 in the fore-aft direction. Mount 110 also extends into pocket 359, where mount 110 is secured by passing fastener 314 through hole 312 in yoke 350 and mount 110. In some embodiments, it is advantageous for at least a portion of second housing to extend through channel 358 when in an installed position. Mount 110 can have a thickness that tapers or is otherwise reduced for the portion that is located within channel 358 when mount 110 is in the installed position.

First isolator 370 has a central portion 371 which has a frontal area shape that fits within and is smaller than or equal to a frontal area of inner pocket 357. Vertical elastomeric stiffness and damping elements 372 are attached to the top and bottom surfaces of central portion 371. Vertical elastomeric stiffness and damping elements 372 can be, in some embodiments, elastomeric layers that are laminated between metallic support layers. Vertical elastomeric stiffness and damping elements 372 provide damping, e.g., compliant force and vibration isolation, and aid in reacting forces with vertically-oriented vector components. In some embodiments, the elastomeric materials may comprise silicone and/or rubber compounds. A plurality of through-holes, generally designated 326, are formed through an entire thickness of the central portion 371 of first isolator 370. A hole 376 is formed through a thickness of central portion 371 to receive a first portion of trunnion pin 340. A pocket 374, which has a cross-sectional area at least as large as the outer perimeter of mount 110 and extends through the entire depth of first isolator 370 in a fore-aft direction of the aircraft, is formed in first isolator 370. First isolator 370 has a frontal area shape that fits within and is smaller than or equal to a frontal area of inner pocket 357.

Second isolator 380 has a central portion 381 which has a frontal area shape that fits within and is smaller than or equal to a frontal area of inner pocket 357. Vertical elastomeric stiffness and damping elements 382 are attached to the top and bottom surfaces of central portion 381. Thrust elastomeric dampers 384 are attached to the fore and aft-directed surfaces of central portion 381. Vertical and thrust elastomeric stiffness and damping elements 382 and 384 can be, in some embodiments, elastomeric layers that are laminated between metallic support layers. Vertical elastomeric stiffness and damping elements 382 provide damping, e.g., compliant force and vibration isolation, and aid in reacting forces with vertically-oriented vector components. Thrust elastomeric dampers 384 provide damping, e.g., compliant force and vibration isolation, and aid in reacting forces with fore/aft-oriented vector components, such as those that are typically aligned with the direction of thrust generated by an engine attached to yoke 350. As such, second isolator 380 is configured to provide damping, e.g., compliant force and vibration isolation, in the vertical and thrust directions. The fore/aft direction can, in some embodiments, be aligned with the positive and negative thrust forces generated by an engine of the aircraft. In some embodiments, the elastomeric materials may comprise silicone and/or rubber compounds. A hole 386 is formed through a thickness of central portion 381 to receive a second portion of trunnion pin 340. Second isolator 380 has a frontal area shape that fits within and is smaller than or equal to a frontal area of inner pocket 357. In some embodiments, the hole 322 of the second housing 320 and/or the hole 386 of the second isolator 380 comprise a friction-reducing material.

In some embodiments, second isolator 380 comprises a second mount 110 and the second mount 110 is configured to counter a yaw moment produced when the second isolator 380 is reacting thrust loads, for example, in scenarios where the stresses experienced are too high on second isolator 380 for it to provide vibration and force isolation using only elastomeric materials, such as vertical elastomeric stiffness and damping elements 382 and thrust elastomeric stiffness and damping elements 384.

First isolator 370 and second isolator 380 are located, when system 112 is in an assembled state, within inner pocket 357, with first isolator being located to at least partially block the removal of second isolator 380 from inner pocket 357. Since mount 110 is secured at least partially within first isolator 370, both second housing 320 of mount 110 and first isolator 370 are configured to move laterally, e.g., in a direction perpendicular to the plane defined by flexure 330 when in a non-deflected state. Trunnion pin 340 is inserted through hole 376 of first isolator 370, passing through hole 322 of second housing 320, and at least partially through hole 386 formed in second isolator 380. As such, first and second isolators 370 and 380 define respective force reaction planes, where the first isolator 370 reacts vertical components of forces transmitted into center mount 356 by trunnion pin 340 and second isolator 380 reacts vertical and lateral components of forces transmitted into center mount 356 by trunnion pin 340. In some embodiments, trunnion pin 340 is substantially free to slide statically within the second housing 320 and the second isolator 380 when trunnion pin 340 is subjected to negligible radial load.

An example method of manufacture of the center mount 365 is disclosed herein. This method comprises one or more of: forming a hole 312 through a thickness of the first housing 310; forming a hole 322 through a thickness of the second housing 320 to define an internal support surface 324; forming one or more holes 326 through the thickness of the second housing 320; forming a channel around a perimeter of one or both of the first and second housings 310 and 320; arranging a first housing 310 and a second housing 320 adjacent to each other at respective snubbing surfaces 318 and 328 thereof; forming a flexure 330 by wrapping a wire around a perimeter of the first and second housings, wherein the flexure 330 is contained, at least partially or entirely, within the channel formed about the perimeter of the first and second housings 320; providing a yoke 350, which may be attached to a fuselage 360 of an aircraft; attaching vertical and thrust elastomeric stiffness and damping elements 382 and 384 to the respective upper/lower and fore/aft surfaces of a central portion 381 of second isolator 380; forming a hole 386 through a thickness of central portion 381 to receive a second portion of trunnion pin 340; inserting second isolator 380 into inner pocket 357, which extends, at least partially or entirely, through a thickness of yoke 350; attaching vertical elastomeric stiffness and damping elements 372 onto a central portion 371 of first isolator 370, forming a plurality of through-holes 326 through an entire thickness of the central portion 371 of first isolator 370; forming a hole 376 through a thickness of central portion 371 to receive a first portion of trunnion pin 340; forming a pocket 374 of first isolator 370, which has a cross-sectional area at least as large as the outer perimeter of mount 110 and extends through the entire depth of first isolator 370 in a fore-aft direction of the aircraft; inserting the first isolator 370 into inner pocket 357 to at least partially block the removal of second isolator 380 from inner pocket 357; forming a passage, generally designated 358, through a fore and/or aft surface of the yoke 350; forming a pocket 359 in the yoke; inserting mount 110 through passage 358 of yoke 350 and pocket 374 of first isolator 358, such that the first housing 310 of the mount 110 is received within the pocket 359 and the second housing 320 of the mount 110 is received at least partially within the pocket 374 formed in the first isolator 370; securing the first housing 310 within the pocket 359 of the yoke by extending and securing a fastener 314 through hole 312 of the first housing 310; movably securing the second housing 320 within the pocket 374 of the first isolator 370 by passing and securing fasteners 327 through each of the one or more holes 326 formed in second housing 320; inserting a trunnion pin 340 through the hole 376 of the first isolator 370, through the hole 322 of the second housing, and at least partially into the hole 386 of the second isolator 380; transmitting, via the trunnion pin 340, a force into the mount 110; and reacting the force with the mount 110, such that the first and second housings 310 and 320 move relative to each other in one or more of the fore-aft, vertical, and lateral directions. In some embodiments, the force comprises one or more vectors in the fore-aft, vertical, and lateral directions.

A method of providing compliant isolation in an engine mount device according to any of the embodiments above is also provided herein. This includes installing a housing within a socket of a frame configured to support an engine; inserting a carrier within an internal cavity of the housing; securing the carrier within the housing via a flexure; transmitting a force into the carrier via a hole in the carrier; mechanically isolating the carrier from the housing via the flexure; and providing, via the flexure, high stiffness in one or more radial direction of the hole and low stiffness in an axial direction of the hole. In some embodiments, the method comprises providing a plurality of flexing layers, as in the embodiments illustrated in FIGS. 1-9B. In some aspects, the method comprises forming, in one or more flexing layer of the plurality of flexing layers, one or more slots in one or more portions of the one or more flexing layer, with the one or more portions not being in contact, at least in part, with the carrier or the housing. The method may further comprise reducing a stiffness of the engine mount device in a vertical direction by the one or more slots. According to some aspects, the method comprising coating the flexure with an elastomeric material to provide damping, e.g., force and/or vibration isolation between the carrier and the housing, and/or environmental protection. In other such aspects of the method, the method comprises limiting a deflection of the carrier relative to the housing by forming one or more snubbing surfaces in the housing and/or the carrier. The method may include providing the engine mount device such that the stiffness in the vertical radial direction of the hole is greater than the stiffness in the axial direction. In other aspects, the stiffness in the vertical radial direction of the hole is substantially similar to the stiffness in the axial direction of the hole. In some such aspects, the stiffness in the lateral radial direction of the hole is at least one order of magnitude greater than the stiffness in either the vertical radial or the axial directions of the hole. The method also includes bending the flexure when the carrier is axially displaced relative to the housing to provide the low stiffness in the axial direction of the hole. As is shown in the device of FIGS. 8A and 8D, where cocking deflections are to be accommodated, the method may include connecting the internal pivot member to the carrier so the internal pivot member is configured to pivot within the carrier, and pivoting the internal pivot member within the carrier. In other aspects of the method, the method comprises limiting a degree of pivoting movement of the internal pivot member by a gap between an outer wall of the internal pivot member and an inner race defined by the hole of the carrier. In another embodiment, such as in the device of FIGS. 9A and 9B, the method includes pivotably installing the engine mount device within a rigid monoball structure or installing a rigid monoball structure within the carrier of the engine mount device for providing pivotable rotation.

The embodiments described herein are examples only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims.

What is claimed is:

1. An engine mount device comprising:
a housing;
a carrier that is at least partially inside the housing, the carrier comprising a hole through at least a partial thickness of the carrier, the hole being configured to receive a trunnion pin; and
at least one flexure connecting the carrier to the housing,
wherein the at least one flexure has a stiffness in one or more radial directions of the hole that is at least double to a stiffness in an axial direction of the hole,
wherein the housing and/or the carrier comprise one or more snubbing surfaces configured to limit a deflection of the carrier relative to the housing.

2. The engine mount device of claim 1, wherein a cavity is formed in the housing and the carrier is positioned at least partially within the cavity of the housing.

3. The engine mount device of claim 1, wherein the at least one flexure comprises a plurality of flexing layers.

4. The engine mount device of claim 3, wherein each of the plurality of flexing layers are spaced apart by spacers from adjacent flexing layers of the plurality of flexing layers.

5. The engine mount device of claim 4, wherein one or more of the plurality of flexing layers comprise one or more slots in upper and/or lower portions thereof.

6. The engine mount device of claim 5, wherein each slot is at least a partial length of the upper portion or lower portion in which such slot is disposed.

7. The engine mount device of claim 1, wherein the at least one flexure is in a shape of a stadium having two semicircular ends connected by substantially linear connecting portions.

8. The engine mount device of claim 7, wherein a first end of the at least one flexure is in contact with the housing at a housing-flexure support surface (HFSS), the HFSS having a substantially similar profile to that of the first end of the at least one flexure, wherein a second end of the at least one flexure is in contact with the carrier at a carrier-flexure support surface (CFSS) (150), the CFSS (150) having a substantially similar profile to that of the second end of the at least one flexure, and wherein the at least one flexure comprises at least one upper portion and one lower portion between the first and second ends of the at least one flexure.

9. The engine mount device of claim 7, wherein an axial movement of the carrier relative to the housing causes a bending of a portion of the at least one flexure within a bending region corresponding to the connecting portions of the stadium.

10. The engine mount device of claim 1, wherein the at least one flexure comprises a wire wrapped to connect the carrier to the housing.

11. The engine mount device of claim 10, wherein the wire is a single continuous wire wrapped around the carrier and the housing.

12. The engine mount device of claim 1, wherein a first end of the at least one flexure is in contact with the housing at a housing flexure support surface (HFSS), the HFSS having a substantially similar profile to that of the first end of the at least one flexure, wherein a second end of the at least one flexure is in contact with the carrier at a carrier-flexure support surface (CFSS), the CFSS having a substantially similar profile to that of the second end of the at least one flexure, and wherein the at least one flexure comprises at least one upper portion and one lower portion between the first and second ends of the at least one flexure.

13. The engine mount device of claim 1, wherein an axial movement of the carrier relative to the housing causes a bending of a portion of the at least one flexure.

14. The engine mount device of claim 1, wherein the at least one flexure comprises an elastomeric material configured to provide damping and/or environmental protection.

15. The engine mount device of claim 14, wherein the elastomeric material is molded to coat all components of the at least one flexure.

16. The engine mount device of claim 1, wherein the one or more snubbing surfaces comprise reverse thrust snubbing surfaces and/or forward thrust snubbing surfaces (136, 156, 216, 236) in the housing and/or the carrier.

17. The engine mount device of claim 16, wherein the at least one flexure is pre-tensioned such that, when no force is transmitted to the carrier, the carrier contacts the housing (120, 200) at the reverse thrust snubbing surfaces.

18. The engine mount device of claim 17, wherein the carrier is configured to contact the housing at the forward thrust snubbing surfaces when a forward thrust force is transmitted to the carrier that would result in deformation of the at least one flexure.

19. The engine mount device of claim 1, comprising an internal pivot member pivotably connected to the carrier via one or more revolute pins inserted within one or more corresponding sockets of the carrier, the internal pivot member being pivotably disposed within the hole of the carrier.

20. The engine mount device of claim 19, wherein a sliding surface of the one or more revolute pins and/or the one or more corresponding sockets of the carrier comprises a friction-reducing coating.

21. The engine mount device of claim 19, wherein a degree of pivoting movement of the internal pivot member within the carrier is limited by a pivot gap between an outer wall of the internal pivot member and an inner race defined by the hole of the carrier.

22. The engine mount device of claim 1, wherein the engine mount device comprises a rigid monoball structure.

23. The engine mount device of claim 1, wherein the engine mount device is pivotably inserted within a rigid monoball structure.

24. The engine mount device of claim 1, comprising at least two rotary spindles within notches in the carrier,
- wherein the housing comprises at least a first housing portion and a second housing portion,
- wherein the carrier is connected to the first housing portion by the at least one flexure,
- wherein each rotary spindle is secured to the carrier by a pin, wherein the first housing portion comprises channels therein,
- wherein the at least one flexure comprises a single continuous wire secured around the at least two rotary spindles,
- wherein portions of the at least one flexure between the at least two rotary spindles are held within the channels of the first housing portion,
- wherein the at least two rotary spindles define an axis of rotation for the carrier relative to the housing, and
- wherein the carrier is configured to rotate about the axis of rotation.

25. The engine mount device of claim 1, wherein:
- the housing comprises at least a first housing portion and a second housing portion,
- the at least one flexure comprises a plurality of flexures, and
- the carrier is connected to the first housing portion by the plurality of flexures.

26. The engine mount device of claim 25, wherein each of the plurality of flexures comprises a wire.

27. The engine mount device of claim 26, wherein the wire is a single continuous wire wrapped around the carrier and the first housing portion.

28. The engine mount device of claim 26, comprising a plurality of rotary spindles within notches in the carrier,
- wherein each rotary spindle is secured to the carrier by a pin,
- wherein the first housing portion comprises a plurality of flexure passages,
- wherein each of the plurality of flexures is secured to the carrier at one of the plurality of rotary spindles and to the first housing portion at a corresponding one of the plurality of flexure passages,
- wherein the plurality of rotary spindles define an axis of rotation for the carrier relative to the housing, and
- wherein the carrier is configured to rotate about the axis of rotation.

29. The engine mount device of claim 28, wherein at least one pin and/or at least one of the plurality of rotary spindles has a sliding surface comprising a friction-reducing coating.

30. The engine mount device of claim 25, wherein the second housing portion and the carrier each comprise a lateral snubbing surface (215, 235) configured to limit a lateral movement of the carrier relative to the second housing portion.

31. The engine mount device of claim 30, wherein a degree of pivoting movement of the carrier relative to the first housing portion is limited by a gap between the lateral snubbing surfaces of the carrier and the second housing portion.

32. The engine mount device of claim 25, wherein the first housing portion, the second housing portion, and/or the carrier comprise one or more snubbing surfaces configured to limit a deflection of the carrier relative to the housing.

33. The engine mount device of claim 32, wherein the first housing portion and the carrier each comprise a reverse thrust snubbing surface.

34. The engine mount device of claim 33, wherein one or more of the plurality of flexures is pre-tensioned such that, when no force is transmitted to the carrier, the carrier contacts the first housing portion at the reverse thrust snubbing surfaces.

35. The engine mount device of claim 32, wherein the second housing portion and the carrier each comprise a forward thrust snubbing surface (216, 236) configured to limit a movement of the carrier relative to the second housing portion in a forward thrust direction, wherein the carrier is configured to contact the second housing portion at the forward thrust snubbing surfaces (216, 236) when a forward thrust force is transmitted to the carrier that would result in deformation of one of the plurality of flexures.

36. The engine mount device of claim 25, wherein one or more of the plurality of flexures are in a shape of a stadium having two semicircular ends connected by substantially linear connecting portions.

37. The engine mount device of claim 25, wherein one or more of the plurality of flexures comprise an elastomeric material configured to damping and/or environmental protection.

38. The engine mount device of claim 37, wherein the elastomeric material is molded to coat one or more of the plurality of flexures.

39. The engine mount device of claim 37, wherein the elastomeric material is formed such that the engine mount device has a substantially continuous and smooth surface.

40. In an engine mount device comprising:
- a housing, a carrier within the housing, and
- at least one flexure flexibly connecting the carrier to the housing, with a trunnion pin being disposed in a hole in the carrier to support an engine,
- a method of providing isolation in the engine mount device, the method comprising:
- transmitting a force from the trunnion pin into the carrier;
- mechanically isolating the carrier from the housing via the at least one flexure; and
- providing, via the at least one flexure, a higher stiffness in one or more radial direction of the hole compared to a stiffness provided in an axial direction of the hole, and
- limiting a deflection of the carrier relative to the housing by forming one or more snubbing surfaces in the housing and/or the carrier.

41. The method of claim 40, wherein the housing comprises a cavity and the carrier is at least partially within the cavity.

42. The method of claim 40, comprising providing a plurality of flexing layers in the at least one flexure.

43. The method of claim 42, comprising
- forming, in one or more flexing layer of the plurality of flexing layers, one or more slots in one or more portions of the one or more flexing layer,
- wherein the one or more portions are not in contact, at least in part, with the carrier or the housing.

44. The method of claim 43, comprising reducing a stiffness of the engine mount device in a vertical direction by forming the one or more slots.

45. The method of claim 40, comprising coating the at least one flexure with an elastomeric material to provide damping between the carrier and the housing and/or environmental vibration.

46. The method of claim 40, wherein a stiffness of the engine mount device in a vertical radial direction of the hole is greater than a stiffness of the engine mount device in the axial direction.

47. The method of claim 40, wherein a stiffness of the engine mount device in a vertical radial direction of the hole is substantially similar to a stiffness of the engine mount device in the axial direction of the hole.

48. The method of claim 40, wherein a stiffness of the engine mount device in a radial direction of the hole is at least one order of magnitude greater than a stiffness of the engine mount device in either a vertical radial direction and/or the axial direction of the hole, wherein the radial direction is aligned with a thrust force transmitted to the engine mount device.

49. The method of claim 40, comprising bending the at least one flexure when the carrier is axially displaced relative to the housing to provide the stiffness in the axial direction of the hole which is lower than the stiffness in the one or more radial direction of the hole.

50. The method of claim 40, comprising:
   connecting an internal pivot member to the carrier so the internal pivot member is configured to pivot within the carrier; and
   pivoting the internal pivot member within the carrier.

51. The method of claim 50, comprising limiting a degree of pivoting movement of the internal pivot member by a pivot gap between an outer wall of the internal pivot member and an inner race defined by the hole of the carrier.

52. The method of claim 40, comprising pivotably installing the engine mount device within a rigid monoball structure.

* * * * *